(12) United States Patent
Kim et al.

(10) Patent No.: US 7,751,403 B2
(45) Date of Patent: Jul. 6, 2010

(54) SELECTIVE COMBINING METHOD AND APPARATUS IN A MOBILE COMMUNICATION SYSTEM

(75) Inventors: Soeng-Hun Kim, Suwon-si (KR); Kook-Heui Lee, Yongin-si (KR); Sung-Ho Choi, Suwon-si (KR); Gert Jan Van Lieshout, Apeldoorn (NL)

(73) Assignee: Samsung Electronics Co., Ltd. (KR)

( * ) Notice: Subject to any disclaimer, the term of this patent is extended or adjusted under 35 U.S.C. 154(b) by 1116 days.

(21) Appl. No.: 11/026,112

(22) Filed: Dec. 30, 2004

(65) Prior Publication Data

US 2005/0141443 A1    Jun. 30, 2005

(30) Foreign Application Priority Data

| Dec. 31, 2003 | (KR) | ...................... 10-2003-0101768 |
| Jan. 30, 2004 | (KR) | ...................... 10-2004-0006350 |
| Feb. 11, 2004 | (KR) | ...................... 10-2004-0009134 |
| Apr. 13, 2004 | (KR) | ...................... 10-2004-0025535 |

(51) Int. Cl.
*H04L 12/28* (2006.01)
*H04L 12/56* (2006.01)

(52) U.S. Cl. ...................................... 370/394; 370/338

(58) Field of Classification Search ................. 370/468, 370/469, 349, 394, 328, 338, 389, 465, 392; 455/442, 412.1; 709/213, 230
See application file for complete search history.

(56) References Cited

U.S. PATENT DOCUMENTS 5,883,888 A    3/1999  St-Pierre 6,307,834 B1    10/2001  Worster
7,254,616 B1 *   8/2007  Ennis et al. .................. 709/213

(Continued)

FOREIGN PATENT DOCUMENTS

EP    1 367 848    12/2003

(Continued)

OTHER PUBLICATIONS $3^{rd}$ Generation Partnership Project; Technical Specification Group Radio Access Network; MAC Protocol Specification (Release 5), 3GPP TS 25.321 V5.0.0, Mar. 2002.

*Primary Examiner*—Ayaz R Sheikh
*Assistant Examiner*—Chuong T Ho
(74) *Attorney, Agent, or Firm*—The Farrel Law Firm, LLP

(57) ABSTRACT

An apparatus and method for selectively combining broadcast data packets from a plurality of cells in a user equipment (UE). A selective combiner stores a received broadcast data packet in a buffer if a sequence number of the broadcast data packet received from the plurality of cells does not fall within a reception window, and stores the received broadcast data packet in the buffer if a sequence number of the received broadcast data packet falls within the reception window but has not been stored in the buffer. The selective combiner updates the reception window if a sequence number of the received broadcast data packet does not fall within the reception window, and discards the received broadcast data packet if a sequence number of the received broadcast data packet falls within the reception window but has been stored in the buffer.

12 Claims, 12 Drawing Sheets

U.S. PATENT DOCUMENTS

| | | |
|---|---|---|
| 7,593,407 B2 * | 9/2009 | Chun et al. .................. 370/394 |
| 2002/0107019 A1 | 8/2002 | Mikola et al. |
| 2003/0035410 A1 | 2/2003 | Laroia et al. |
| 2003/0231612 A1 | 12/2003 | Kim et al. |
| 2004/0184437 A1 * | 9/2004 | Lee et al. .................... 370/349 |
| 2004/0203615 A1 * | 10/2004 | Qu et al. .................. 455/412.1 |
| 2004/0229624 A1 * | 11/2004 | Cai et al. .................... 455/449 |
| 2005/0078653 A1 * | 4/2005 | Agashe et al. ............... 370/349 |
| 2005/0100048 A1 * | 5/2005 | Chun et al. .................. 370/468 |
| 2007/0184840 A1 * | 8/2007 | Zhang et al. ................. 455/442 |
| 2007/0198737 A1 * | 8/2007 | Xu et al. ..................... 709/230 |
| 2007/0268932 A1 * | 11/2007 | Lee et al. .................... 370/469 |

FOREIGN PATENT DOCUMENTS

| | | |
|---|---|---|
| JP | 2007-510355 | 4/2007 |
| WO | WO 01/39403 | 5/2001 |
| WO | WO 03/096149 | 11/2003 |
| WO | WO 2005/046086 | 5/2005 |

\* cited by examiner

SELECTIVE COMBINING METHOD AND APPARATUS IN A MOBILE COMMUNICATION SYSTEM

PRIORITY

This application claims priority under 35 U.S.C. §119 to an application entitled "Selective Combining Method in a Mobile Communication System" filed in the Korean Intellectual Property Office on Dec. 31, 2003 and assigned Serial No. 2003-101768, an application entitled "Selective Combining Method in a Mobile Communication System" filed in the Korean Intellectual Property Office on Jan. 30, 2004 and assigned Serial No. 2004-6350, an application entitled "Selective Combining Method in a Mobile Communication System" filed in the Korean Intellectual Property Office on Feb. 11, 2004 and assigned Serial No. 2004-9134, and an application entitled "Selective Combining Method in a Mobile Communication System" filed in the Korean Intellectual Property Office on Apr. 13, 2004 and assigned Serial No. 2004-25535, the contents of all of which are incorporated herein by reference.

BACKGROUND OF THE INVENTION

1. Field of the Invention

The present invention relates generally to a data combining method in a mobile communication system, and in particular, to a method for selectively combining the same broadcast data received through a plurality of paths.

2. Description of the Related Art

Currently, a Code Division Multiple Access (CDMA) mobile communication system provides a voice service and a data service in which a large volume of data such as packet data and circuit data is transmitted. It is expected that in the near future, the CDMA mobile communication system will support multimedia broadcast/communication in which a multimedia service can be transmitted.

In a common mobile communication system, because radio transmission resources are limited, it is not efficient to transmit high-rate data on a point-to-point basis. For example, in order to transmit a 64-Kbps video streaming service to one user equipment (UE), radio resources necessary for transmitting 64-Kbps data should be allocated to the UE. However, if the number of UEs increases to n, the required amount of radio resource to be allocated also increases n times.

Alternatively, when a plurality of UEs desire to receive the same service, the service can be provided using the same radio resource regardless of the number of UEs located in the same cell and desire to receive the same service. This makes it possible to efficiently use the radio resource.

In order to support the multimedia broadcast/communication, research is being conducted on a broadcast service provided from several multimedia data sources to a plurality of UEs. A typical example of the broadcast service is Multimedia Broadcast/Multicast Service (MBMS) proposed in $3^{rd}$ Generation Partnership Project (3GPP).

The MBMS service supports transmission of multimedia data, such as real-time image and voice, still image, text, etc., and can simultaneously provide voice data and image data with application of multimedia transmission. Therefore, the MBMS service requires a large amount of transmission resources. The MBMS service can be provided over a broadcast channel because of the possibility that a plurality of UEs will request the same MBMS service.

Generally, the MBMS service can be divided into two service types: a Point-to-Point (PtP) service and a Point-to-Multipoint (PtM) service. In the PtP service where a desired MBMS service is independently provided to each individual UE, dedicated channels should be allocated to the UEs. In the PtM service where an MBMS service is provided in common to a group of UEs requesting the same MBMS service, a common channel should be allocated to the UEs requesting the same MBMS service.

The MBMS service described above refers to the PtM service for efficiently transmitting the same data to a plurality of UEs in an asynchronous Universal Mobile Telecommunications System (UMTS) mobile communication system. The MBMS service is especially advantageous for multimedia transmission that requires a large amount of radio transmission resource. Because the MBMS service can be used for a high-speed multimedia service as well as for various other services, it is expected that applications suitable for the MBMS service will continuously increase in number in the future.

Even though the same MBMS service is provided to a plurality of UEs using a common channel in this way, the limitation on radio resource remains. According to simulations, in order to maintain a predetermined block error rate (BER) on 80 to 90% of a cell while transmitting 64-Kbps data over a common channel, 30% or more of available transmission power of the cell should be used.

The simulation result implies that the following problems should be taken into consideration.

First, in order to provide an MBMS service whose quality can be satisfied by all UEs located in the same cell, most of available transmission power of the cell should be used for one service.

Second, when available transmission power of the cell is limited, there is high possibility that UEs located in the boundary of the cell will experience quality degradation.

In order to solve these problems, there has been proposed a method in which a UE located in the boundary of the cell receives data from a plurality of cells when a particular service is simultaneously transmitted from several neighbor cells. However, only a concept thereof has been discussed, and no detailed method for realizing the concept has been presented yet.

Accordingly, there have been many demands for a detailed method for receiving data transmitted from several cells and appropriately using the data by enabling an appropriate exchange of control signals between a Node B and a UE, and mounting a new device in the UE when a particular service is simultaneously transmitted from several neighbor cells.

SUMMARY OF THE INVENTION

It is, therefore, an object of the present invention to provide a selective combining method for enabling a UE located in a cell boundary to smoothly receive a broadcast service.

It is another object of the present invention to provide a selective combining method for maximizing efficient use of downlink transmission resources.

It is further another object of the present invention to provide a method for selectively combining only error-free data in the same data received through a plurality of paths.

It is yet another object of the present invention to provide a method for performing selective combining using a sequence number assigned to data.

It is still another object of the present invention to provide a method for performing selective combining using a sequence number of a radio link control (RLC) layer.

It is still another object of the present invention to provide a method for identifying data received through different paths with a sequence number of an RLC layer and performing selective combining based on the identification result.

It is still another object of the present invention to provide a method for transmitting a unique sequence number assigning device indicator to each cell from a network in which there are a plurality of sequence number assigning devices.

It is still another object of the present invention to provide a method for determining by a UE whether to perform selective combining based on a sequence number assigning device indicator transmitted from a network.

It is still another object of the present invention to provide a method for performing selective combining on data from a serving cell to a target cell when a sequence number assigning device indicator from the target cell is identical to a sequence number assigning device indicator from the serving cell.

It is still another object of the present invention to provide a method for performing no selective combining on data from a serving cell to a target cell when a sequence number assigning device indicator from the target cell is not identical to a sequence number assigning device indicator from the serving cell.

According to a first aspect of the present invention, there is provided a method for selectively combining broadcast data packets from a plurality of cells in a user equipment (UE). The method includes the steps of receiving a broadcast data packet from the plurality of cells; if a sequence number of the received broadcast data packet does not fall within a reception window, storing the broadcast data packet in a buffer and updating the reception window based on the sequence number; if the sequence number of the received broadcast data packet falls within the reception window, determining if a broadcast data packet having the sequence number has been stored in the buffer; discarding the broadcast data packet, if the broadcast data packet has been stored in the buffer; and storing the broadcast data packet in the buffer, if the broadcast data packet has not been stored in the buffer.

According to a second aspect of the present invention, there is provided an apparatus for selectively combining broadcast data packets from a plurality of cells in a user equipment (UE). The apparatus includes a buffer; and a selective combiner for storing a received broadcast data packet in the buffer if a sequence number of the broadcast data packet received from the plurality of cells does not fall within a reception window, and storing the received broadcast data packet in the buffer if a sequence number of the received broadcast data packet falls within the reception window but has not been stored in the buffer. The selective combiner updates the reception window if a sequence number of the received broadcast data packet does not fall within the reception window, and discards the received broadcast data packet if a sequence number of the received broadcast data packet falls within the reception window but has been stored in the buffer.

According to a third aspect of the present invention, there is provided a method for selectively-combining, by a user equipment (UE), broadcast data packets from a serving cell and at least one target cell in a mobile communication system including the UE, the serving cell for providing a particular broadcast service through a primary link set up by the UE, the target cell for providing the particular broadcast service through a secondary link set up by the UE, and a radio network controller (RNC) for providing broadcast data packets for the particular broadcast service to the serving cell and the target cell. The method includes the steps of receiving a broadcast data packet from the serving cell and the target cell; determining if the same broadcast data packet as the received broadcast data packet has already been received; discarding the received broadcast data packet, if the received broadcast data packet is identical to the previously received broadcast data packet; storing the received broadcast data packet in a buffer, if the received broadcast data packet is not identical to the previously received broadcast data packet; reordering broadcast data packets stored in the buffer in the order of sequence number; and delivering, to an upper layer, a broadcast data packet having a sequence number preceding a reception-failed sequence number, among the reordered broadcast data packets; wherein the sequence number is an indicator for distinguishing the broadcast data packet, and the same sequence number is assigned to the same broadcast data packet in the serving cell and the target cell.

According to a fourth aspect of the present invention, there is provided an apparatus for selectively-combining, by a user equipment (UE), broadcast data packets from a serving cell and at least one target cell in a mobile communication system including the UE, the serving cell for providing a particular broadcast service through a primary link set up by the UE, the target cell for providing the particular broadcast service through a secondary link set up by the UE, and a radio network controller (RNC) for providing broadcast data packets for the particular broadcast service to the serving cell and the target cell. The apparatus includes a duplication checker for determining if the same broadcast data packet as a broadcast data packet received from the serving cell and the target cell has already been received, discarding the received broadcast data packet if the received broadcast data packet is identical to a previously received broadcast data packet, and storing the received broadcast data packet in a reordering buffer if the received broadcast data packet is not identical to a previously received broadcast data packet; and the reordering buffer for reordering the broadcast data packets stored therein in the order of sequence number, and delivering, to an upper layer, a broadcast data packet having a sequence number preceding a reception-failed sequence number, among the reordered broadcast data packets; wherein the sequence number is an indicator for distinguishing the broadcast data packet, and the same sequence number is assigned to the same broadcast data packet in the serving cell and the target cell.

According to a fifth aspect of the present invention, there is provided a method for selectively combining broadcast data packets from a plurality of cells in a user equipment (UE). The method includes the steps of allocating a reception window based on a sequence number of a broadcast data packet first received from the plurality of cells, and a predetermined reception window size; determining if a sequence number of a broadcast data packet received from the plurality of cells falls within the reception window; determining if a broadcast data packet having the same sequence number as the sequence number has already been stored in a buffer, if the sequence number falls within the reception window; discarding the received broadcast data packet, if a broadcast data packet having the same sequence number as the sequence number has already been stored in the buffer; storing the received broadcast data packet in the buffer, if a broadcast data packet having the same sequence number as the sequence number has not been stored in the buffer; storing the received broadcast data packet in the buffer, if the sequence number does not fall within the reception window; updating the reception window based on the sequence number and the predetermined reception window size; and delivering, to an upper layer, a broadcast data packet having a sequence number which is outside a range of the updated reception window, among the broadcast data packets stored in the buffer.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
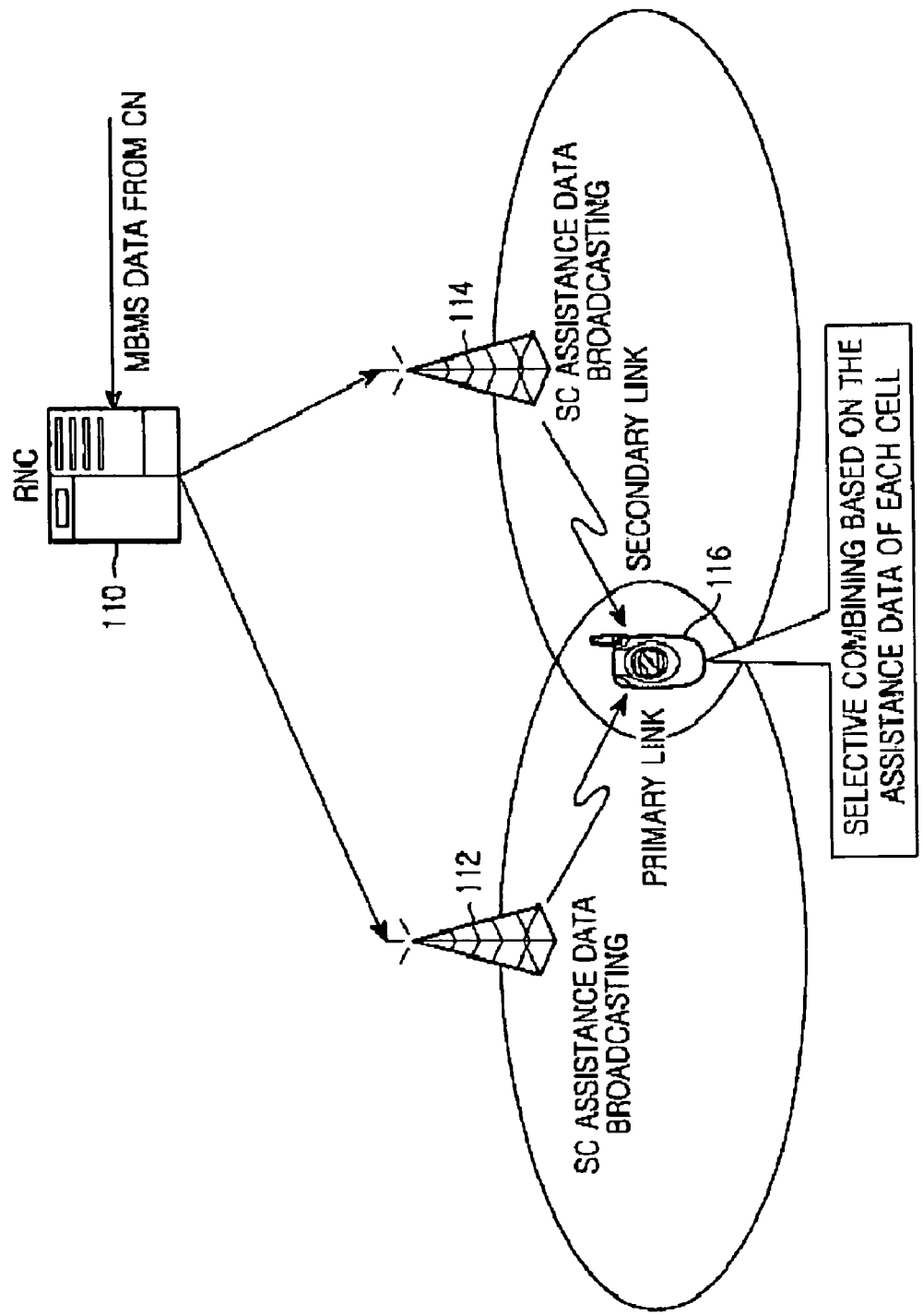
FIG. 1 is a diagram illustrating a UMTS Terrestrial Radio Access Network (UTRAN) in a UMTS mobile communication system to which an embodiment of the present invention is to be applied.

Several preferred embodiments of the present invention will now be described in detail herein below with reference to the annexed drawings. In the following description, a detailed description of known functions and configurations incorporated herein has been omitted for conciseness. Although embodiments of the present invention will be restrictively applied to an MBMS service, they can also be applied to other types of broadcast services.

However, before a detailed description of the present invention is made, a definition of the terms frequently used herein will be given below.

Multicast Control Channel (MCCH): This is a channel over which MBMS service-related information of each cell is transmitted. Information on the type of an MBMS service provided by each cell and information on a configuration of a radio bearer over which the MBMS service is being provided, can be transmitted over this channel. In addition, the other information that a UE should have in order to receive an MBMS service can be transmitted over the multicast control channel.

Radio Link Control Packet Data Unit (RLC PDU): In a UMTS mobile communication system, Layer 2 (L2) is comprised of a radio link control (RLC) layer and a medium access control (MAC) layer. The RLC layer assembles data transmitted by an upper layer in an appropriate size, inserts a header into the data, and transmits the header-inserted data to a lower layer (MAC layer). Further, the RLC layer analyzes a header of data transmitted by the lower layer (MAC layer), performs an appropriate operation according to the analysis result, and transmits the operation result to the upper layer. The data exchanged at that time between the RLC layer and the lower layer (MAC layer) is called "RLC PDU." For simplicity, the RLC PDU will be represented herein by "PDU."

RLC PDU Sequence Number (RLC PDU SN): This is a sequence number included in a header of an RLC PDU, and is increased in regular succession according to transmission order. The RLC PDU SN is used as information for distinguishing an RLC PDU for selective combining proposed in the present invention. For simplicity, the RLC PDU SN will be represented herein by "SN."

Selective Combining (SC) Assistance Data: This is data used together with an RLC SN to distinguish the same broadcast data in broadcast data received from a plurality of cells and to perform selective combining thereon. The present invention proposes an RLC SN version and a selective combining (SC) indicator, as the selective combining assistance data.

RLC SN Version: This is a value determined by counting how many times an RLC SN is reset by transmission of an RLC PDU, and is used when it is not possible to determine identity of RLC PDUs received from different cells with only an RLC SN due to a propagation delay. For simplicity, the RLC SN version will be represented herein by "SN version."

SC Indicator: This is information indicating whether a specific MBMS service provided in a particular cell supports selective combining.

Commonly, a broadcast service is characterized in that in most cases, one broadcast service is simultaneously provided in a plurality of neighbor cells. Particularly, an MBMS service, a typical example of the broadcast service, also has such a characteristic. Therefore, the present invention uses only error-free broadcast data in the broadcast data for the same broadcast service, which is received from a plurality of cells, and herein, this operation will be referred to as "selective combining." By using the selective combining, a selective combining gain can be obtained. For example, assuming that a UE receives broadcast data for a particular broadcast service from both a cell#1 and a cell#2, if broadcast data received from the cell#1 has an error and the same broadcast data received from the cell#2 has no error, then the UE uses only the broadcast data received from the cell#2. In this way, the UE can acquire error-free broadcast data.

For the selective combining, the UE should previously set up radio links to a plurality of cells, and should be able to distinguish the same data in the broadcast data received through different radio links. Accordingly, the present invention proposes a method of distinguishing the same broadcast data using selective combining assistance data and an SN.

A. First Embodiment

In order for a UE to distinguish RLC PDUs using SNs of PDUs received through a plurality of links, a network should satisfy the following particulars.

First, PDUs with the same size should be transmitted to the target links of selective combining. This is possible by setting the same PDU size for the links for which selective combining is to be performed.

Second, the same SN should be assigned to the PDUs transmitted to the target links of selective combining. That is, if a PDU received through a primary link and a PDU received through a secondary link have the same SN, it is said that they are the same PDUs. This is automatically satisfied if the first condition is satisfied. This is because, for both PDUs transmitted through the primary link and the secondary link, the same MBMS data transmitted from a core network is assembled into PDUs with the same size and then the same SN is assigned to the PDUs.

Third, a UE should be able to distinguish PDUs received through target links of selective combining, using an SN. Because the SN has a value between 0 and 127, a difference between SNs of PDUs received at the same time through a primary link and a secondary link should not be larger than 128/2=64. If the difference is larger than 64, the UE cannot determine the correct order of the PDU received through the secondary link. For example, if a PDU having an SN 'a' is received from the primary link and a PDU having an SN '(a+64)' is received from the secondary link at a specific time, the UE cannot determine if the PDU received from the secondary link is a PDU that was transmitted 64 PDUs ahead of the PDU received from the primary link, or a PDU that was transmitted 64 PDUs after the PDU received from the primary link.

There are two proposed methods for satisfying the third condition. In the first proposed method, a network synchronizes data transmission of each link. In the second proposed method, there is no restriction on data transmission of each link, but assistance data that can be used as indicators of PDUs is separately transmitted to each cell.

Herein, the present invention will be described based on the second proposed method. However, although the first proposed method is used instead of the second proposed method, essential parts of the present invention remain unchanged. For example, an operation of detecting duplicately received data and a reordering operation, performed by a selective combiner, remain unchanged.

In order to use the second proposed method, the present invention causes each cell to periodically broadcast selective combining assistance data, and causes a UE receiving broadcast data from two or more cells to perform selective combining using the selective combining assistance data and an SN assigned to the broadcast data.

To summarize, a radio network controller (RNC) providing a particular MBMS service announces selective combining assistance data for the MBMS service to each cell from which the MBMS service is provided. The "selective combining assistance data" refers to data that a UE should detect in order to perform selective combining. For example, the selective combining assistance data can be data (SC indicator) indicating if a particular MBMS service can undergo selective combining in the cell, or assistance data (SN version) used for identification of a PDU transmitted from the cell. While receiving an MBMS service from a particular cell, if a UE discovers a new cell providing its desired MBMS service in a good radio environment, the UE acquires selective combining assistance data announced from the new cell. The UE performs selective combining on the MBMS data transmitted from the plural cells using the selective combining assistance data.

The selective combining operation, as described above, refers to an operation of discarding duplicately received PDUs among PDUs received through the primary link and the secondary link, and transmitting PDUs reordered in the order of their transmission, to an RLC entity. The selective combining assistance data can also be used for identifying PDUs received through the primary link and the secondary link in the above process.

The present invention presents a selective combiner as a device for performing the selective combining. The selective combiner is preferably located between a MAC layer and an RLC layer. The selective combiner is formed as soon as a secondary link is setup, and is not used when there is only one link among a plurality of links currently set up. The secondary link indicates a physical layer/MAC layer that will process MBMS data transmitted from a new cell.

A description will now be made of an operation of performing selective combining using an SN version and an SC indicator as selective combining assistance data according to an embodiment of the present invention.

FIG. 1 is a diagram illustrating a configuration of a UMTS Terrestrial Radio Access Network (UTRAN) in a UMTS mobile communication system to which an embodiment of the present invention is to be applied. In FIG. 1, the UTRAN is includes a cell, a Node B, and a radio network controller (RNC). In the UTRAN, a plurality of RNCs can exist, and each of the RNCs can control a plurality of Node Bs. Each of the Node Bs controls a plurality of cells. An RNC, Node Bs controlled by the RNC, and a plurality of cells controlled by the Node Bs constitute a radio network subsystem (RNS).

FIG. 1 illustrates only one of a plurality of RNSs included in the UTRAN, and it is assumed that each of two Node Bs included in the RNS controls one cell. Commonly, the cell serves as only a physical layer of its Node B. Therefore, in the following description, it will be assumed that the Node B and the cell are identical to each other in terms of the meaning.

Referring to FIG. 1, an RNC 110 assembles MBMS data provided from a core network into a PDU, and provides the PDU to two neighbor cells 112 and 114. The RNC 110 periodically transmits selective combining assistance data for each MBMS service to each of the two neighbor cells 112 and 114 over an MCCH.

The selective combining assistance data includes an SN version and an SC indicator. The SN version is assistance data used for distinguishing the order of a PDU received through a primary link and a PDU received through a secondary link. An SN of a PDU is primarily used for distinguishing the order of PDUs received from respective links. However, because the SN has only 7 bits, it may not reflect a possible difference between the links in terms of a transmission situation.

For example, if a difference between the primary link and the secondary link in number of PDUs transmitted therethrough is several hundreds, the SN is of no assistance in distinguishing the order of received PDUs. In order words, if an $x^{th}$ PDU is transmitted through the primary link while an $(x+500)^{th}$ PDU is transmitted through the secondary link, an SN having a value between 0 and 127 is of no assistance in distinguishing the order of received PDUs. The SN version is a parameter bringing about an effect of extending SNs so that a UE can distinguish PDUs although the foregoing transmission situation occurs. The RNC 110 increases the SN version by 1 each time an SN of a PDU formed for each link is wrapped around, and periodically broadcasts the SN version. Herein, the wraparound of an SN indicates a return from 127 to 0, by way of example.

An SC indicator forming the selective combining assistance data is a value indicating if it is possible to selectively-combine a PDU transmitted through a corresponding link with a PDU transmitted through another link. The SC indicator can be determined by checking if an RLC configuration of the corresponding link satisfies the first and second conditions stated above. For example, if a particular link was driven later than links of neighbor links, the second condition indicating that the same SN should be assigned to PDUs is not satisfied. For such a link, the SC indicator is set to "Impossible" so as to instruct UEs not to perform selective combining.

For example, in this case, the number of UEs desiring to receive a particular MBMS service in a particular cell at a start time of the MBMS service is not so large that a PtM service should be performed. However, during the MBMS service, several UEs may move to the cell, initiating the PtM service. In this case, because a link of the cell is different from a link of another cell in terms of an SN system, a UE cannot perform selective combining between a link of the cell and a link of another cell.

A UE 116, while receiving the MBMS service through a serving cell 112, detects a condition indicating that a radio signal exceeds a threshold. Then the UE 116 sets up a radio link through which it can receive an MBMS service from a new cell 114. In order to set up a radio link to the new cell 114, the UE 116 should analyze control information transmitted from the new cell 114 over an MCCH. The control information includes selective combining assistance data.

The UE 116 determines if its desired MBMS service is provided from the new cell 114 over a common channel, by analyzing the control information. If its desired MBMS service is provided, the UE 116 determines if selective combining is possible. If the selective combining is possible, the UE 116 analyzes information on a radio bearer for the MBMS service from the control information, and sets up a secondary link through which it can receive the MBMS service. The radio bearer includes an RLC layer, a MAC layer, and a physical (PHY) layer. A link includes the MAC layer and the PHY layer among them. Therefore, the UE 116 sets up a radio link established for the new cell 114 as a secondary link, and sets up a radio link formed for the serving cell 112 as a primary link.

The UE 116 forms a selective combiner for performing selective combining on PDUs received through the primary link and PDUs received through the secondary link. The UE 116 provides SN version information corresponding to the primary link and SN version information corresponding to the secondary link to the selective combiner. The selective combiner obtains an SN-extended effect by combining an SN with an SN version. Herein, a value determined by combining an SN with an SN version is called an "extended SN" of a corresponding PDU.

The UE 116 distinguishes duplicately received PDUs among PDUs received through the primary link and the secondary link, using the extended SN. The UE 116 performs a duplication check operation of discarding one of the duplicately received PDUs and transmitting the remaining PDUs to an upper layer. Further the UE 116 performs an operation of reordering PDUs provided through the duplication check so that PDUs can be sequentially transmitted to the RLC layer. The duplication check operation and the reordering operation constitute the selective combining operation proposed in the present invention.

For an embodiment of the present invention described above, the following operations should be described in detail.

First, signaling between an RNC, a cell, and an UE for providing selective combining assistance data should be proposed.

Second, an operation of the RNC for managing selective combining assistance data and periodically transmitting the selective combining assistance data should be proposed.

Third, an operation of performing selective combining by a UE using the selective combining assistance data should be proposed.

1. Signaling

Figure 2:
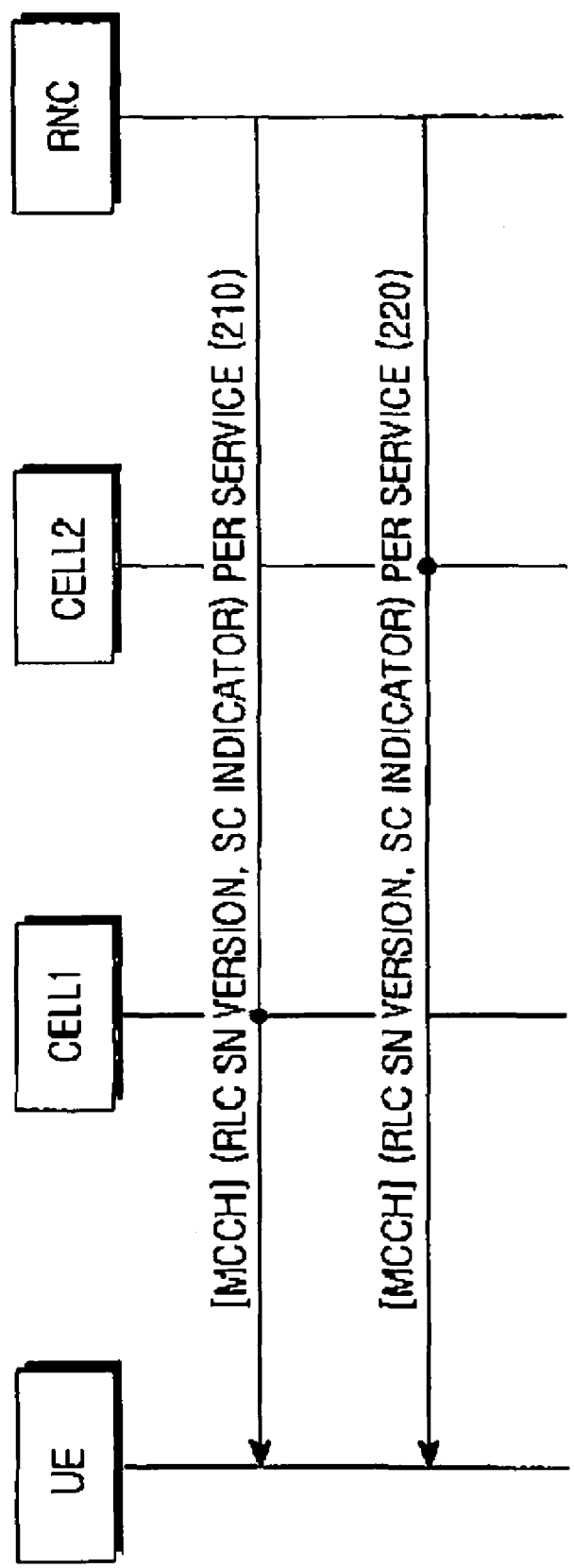
FIG. 2 is a signaling diagram illustrating a procedure for providing selective combining assistance data according to a first embodiment of the present invention.

FIG. 2 is a signaling diagram illustrating a procedure for announcing selective combining assistance data of each cell by an RNC and receiving the selective combining assistance data by a UE according to an embodiment of the present invention. It is assumed in FIG. 2 that a UE, while receiving a particular MBMS service via a serving cell, starts receiving a good signal via a target cell. The "serving cell" refers to a cell that has been providing a particular MBMS service to the UE, while the "target cell" refers to a cell that will newly provide the particular MBMS service due to movement of the UE thereto.

Referring to FIG. 2, in step 210, a UE receives an MCCH from a serving cell. By receiving the MCCH, the UE acquires selective combining assistance data along with information on the type of an MBMS service being currently provided via the serving cell and radio bearer information for link setup. The selective combining assistance data includes an SC indicator for indicating if the serving cell supports selective combining, and an SN version for distinguishing a currently transmitted PDU.

The UE determines if its desired MBMS service is provided from the serving cell, based on the information on the type of an MBMS service. If its desired MBMS service is provided, the UE sets up a radio bearer using radio bearer information corresponding to the MBMS service. The radio bearer can be comprised of an RLC layer, a MAC layer, and a PHY layer. The MAC layer and the PHY layer can be defined as a term "link." In the following description, the MAC layer and the PHY layer formed for the serving cell will be referred to as a "primary link."

Thereafter, the UE determines if the serving cell supports selective combining, based on an SC indicator constituting the selective combining assistance data. If the serving cell does not support selective combining, the UE does not perform selective combining proposed in the present invention. However, if the serving cell supports selective combining, the UE stores therein an SN version constituting the selective combining assistance data.

The UE receives an RLC PDU from the serving cell through the primary link. The LUE detects an SN from the received PDU, and increases an SN version by 1, if it is determined that the SN has an initial value. For example, if an SN of a previously received PDU was set to 127 and an SN of a currently received PDU has returned to 0, the UE increases a current SN version stored therein by 1.

The UE, while receiving an MBMS service from the serving cell, determines if a good signal is received from neighbor cells. Receiving a good signal means having a good radio environment. If a good signal is received, the UE recognizes a neighbor cell transmitting the signal as a target cell. In step 220, the UE receives an MCCH from the target cell, thereby acquiring selective combining assistance data along with information on the type of an MBMS service currently provided via the target cell and radio bearer information for link setup.

The UE determines if its desired MBMS service is provided from the target cell, based on the information on the type of an MBMS service. Here, the "desired MBMS service" indicates the MBMS service being currently provided from the serving cell. If its desired MBMS service is provided, the UE determines if the target cell supports selective combining, based on an SC indicator constituting the selective combining assistance data. If the target cell does not support selective combining, the UE does not perform selective combining proposed in the present invention even though the serving cell supports selective combining. That is, if the target cell does not support selective combining, the UE does not form a secondary link for the target cell. However, if the target cell supports selective combining, the UE sets up a radio bearer using radio bearer information corresponding to the MBMS service. The radio bearer can be comprised of an RLC layer, a MAC layer, and a PHY layer. In the following description, the MAC layer and the PHY layer formed for the target cell will be referred to as a "secondary link." If the secondary link is formed, the UE stores therein an SN version constituting the selective combining assistance data.

The UE receives a PDU from the target cell through the secondary link. The UE detects an SN from the received PDU, and increases the SN version by 1, if a value of the SN is changed to an initial value.

2. Operation of RNC

For an embodiment of the present invention, an RNC should manage selective combining assistance data and periodically provide the selective combining assistance data to each cell. A detailed description will now be made of an operation of periodically transmitting selective combining assistance data by the RNC.

The RNC periodically transmits selective combining assistance data to its cells through MCCHs, which are uniquely set up for the cells. The selective combining assistance data is uniquely set up for each MBMS service. Therefore, if n MBMS services are provided in one cell, n types of selective combining assistance data can be periodically transmitted over an MCCH established for the cell.

An SN version included in the selective combining assistance data is managed and transmitted by the RNC as described below.

Upon receiving an initial request for a particular MBMS service from its cells, the RNC forms an RLC entity, which will process MBMS data for the MBMS service. Subsequently, the RNC initializes an SN version for the MBMS service to 0. Thereafter, the RNC sequentially transmits PDUs for the MBMS service via the RLC entity. The PDU includes an SN, which increases in regular succession according to its transmission order. The SN increases up to a predetermined number beginning at 0. For example, the SN increases form 0 to 127, and then returns to 0 after 127. The RNC increases the SN version by 1 at the time when the SN returns to 0.

The SN version of each cell, managed in the foregoing manner, is periodically announced by the RNC to a cell where the particular MBMS service is being provided, thereby enabling UEs desiring to perform selective combining on the MBMS service to distinguish the SN version.

An SC indicator included in the selective combining assistance data is managed and transmitted by the RNC as described below.

The RNC manages an SC indicator that indicates if selective combining can be supported for each of MBMS services provided through its cells. Here, even the cells providing the same MBMS service can be divided into a cell supporting selective combining and a cell not supporting selective combining. In addition, for a particular MBMS service, selective combining may not be supported regardless of cells. Based on such information, the SC indicator is managed by the RNC. The RNC periodically transmits SC indicators uniquely set for MBMS services.

For example, if selective combining can be supported for a particular MBMS service provided via a cell#1, the RNC sets an SC indicator for the particular MBMS service to "Possible" and periodically broadcasts the SC indicator via the cell#1. If selective combining cannot be supported for a particular MBMS service provided via a cell#2, the RNC sets an SC indicator for the particular MBMS service to "Impossible" and periodically broadcasts the SC indicator.

3. Operation of UE

Figure 3:
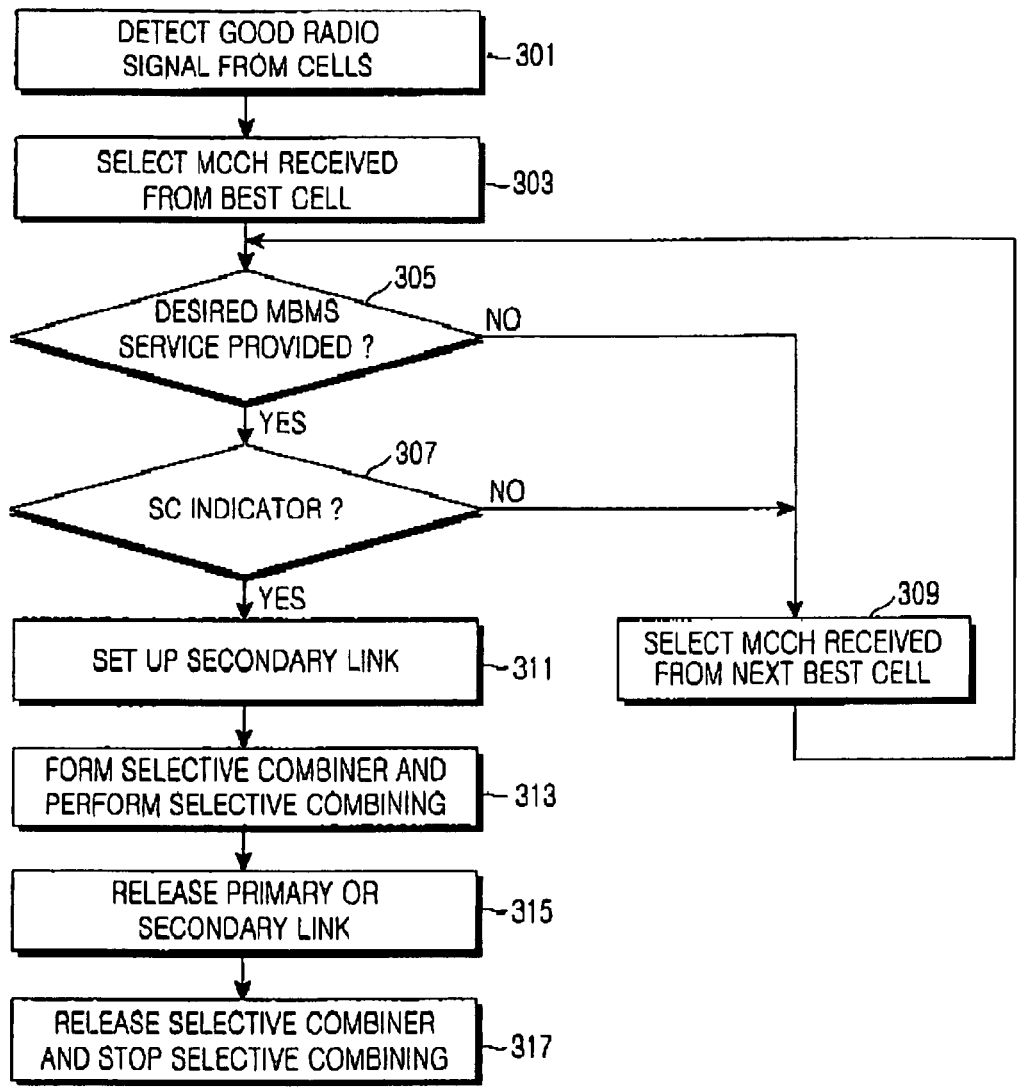
FIG. 3 is a flowchart illustrating a procedure for performing selective combining by a UE according to the first embodiment of the present invention.

FIG. 3 is a flowchart illustrating a procedure for performing selective combining by a UE according to an embodiment of the present invention. It is assumed in FIG. 3 that a radio link has been set up between a UE and a serving cell and a particular MBMS service is being provided through the radio link.

Referring to FIG. 3, in step 301, a UE receives signals from neighbor cells and detects a good signal from the received signals. A definition of the term "good signal" can be given in several ways. For example, the definition can be given using levels of received signals. In this case, if a level of a received signal exceeds a threshold, it can be determined that the received signal is a good signal. The presence of the good signal implies that the UE is close to a neighbor cell from which the good signal was transmitted (hereinafter referred to as a "target cell"). Therefore, the UE can simultaneously receive signals from a serving cell and the target cell. The number of target cells can be one or more.

Assuming that the number of target cells is plural, in step 303, the UE receives MCCHs from the target cells, and selects an MCCH from a target cell from which the best signal is received. The MCCH is used for transmitting indicators for an MBMS service provided from the target cell, radio bearer information of the MBMS service, and selective combining assistance information. After detecting information received over the selected MCCH, the UE proceeds to step 305.

In step 305, the UE determines if the target cell is providing its desired MBMS service. If its desired MBMS service is being provided, the UE proceeds to step 307. However, if its desired MBMS service is not being provided, the UE proceeds to step 309.

In step 307, the UE determines if the target cell supports selective combining based on an SC indicator in the selected combining assistance data. If it is determined from the SC indicator that the target cell supports selective combining, the UE proceeds to step 311. Otherwise, if it is determined that the target cell does not support selective combining, the UE proceeds to step 309.

In step 309, the UE selects an MCCH from a target cell from which the next best signal is received, detects information received over the selected MCCH, and then returns to step 305.

In step 311, the UE sets up a radio link, i.e., a secondary link, to the target cell in order to receive its desired MBMS service. The secondary link is set up based on the radio bearer information received over the MCCH. The radio bearer information includes physical channel information and MAC layer information. The physical layer information is information on a transport channel, and includes code information for a physical channel, the type of channel coding applied to the physical channel, a channel coding rate, and a transmission time interval (TTI). The MAC layer information includes multiplexing information for indicating if multiplexing is applied in a MAC layer, and service identifier (ID) information for indicating if a service ID is used in the MAC layer. The UE sets up a new physical layer based on the physical layer information, and sets up a new MAC layer based on the MAC layer information. The secondary link is the newly set-up physical layer and MAC layer.

After completing setup of the secondary link, the UE forms a selective combiner for selective combining in step 313. Thereafter, the UE connects the selective combiner to the primary link and the secondary link, and performs selective combining on broadcast data received through the primary link and the secondary link. A detailed description of the selective combiner will be made later with reference to FIG. 4.

In step 315, the UE continuously monitors if the primary link or the secondary link needs to be released. The primary link or the secondary link need to be released when a signal whose level is lower than a threshold is received. Upon detecting this situation, the UE releases a link to the corresponding cell.

For example, if a level of the signal received through the primary link is lower than a desired level, the UE releases the primary link. Otherwise, if a level of the signal received through the secondary link is lower than a desired level, the UE releases the secondary link. If it is determined in step 315 that only one link exists, the UE proceeds to step 317, where it release the formed selective combiner, completing the selective combining operation.

Figure 4:
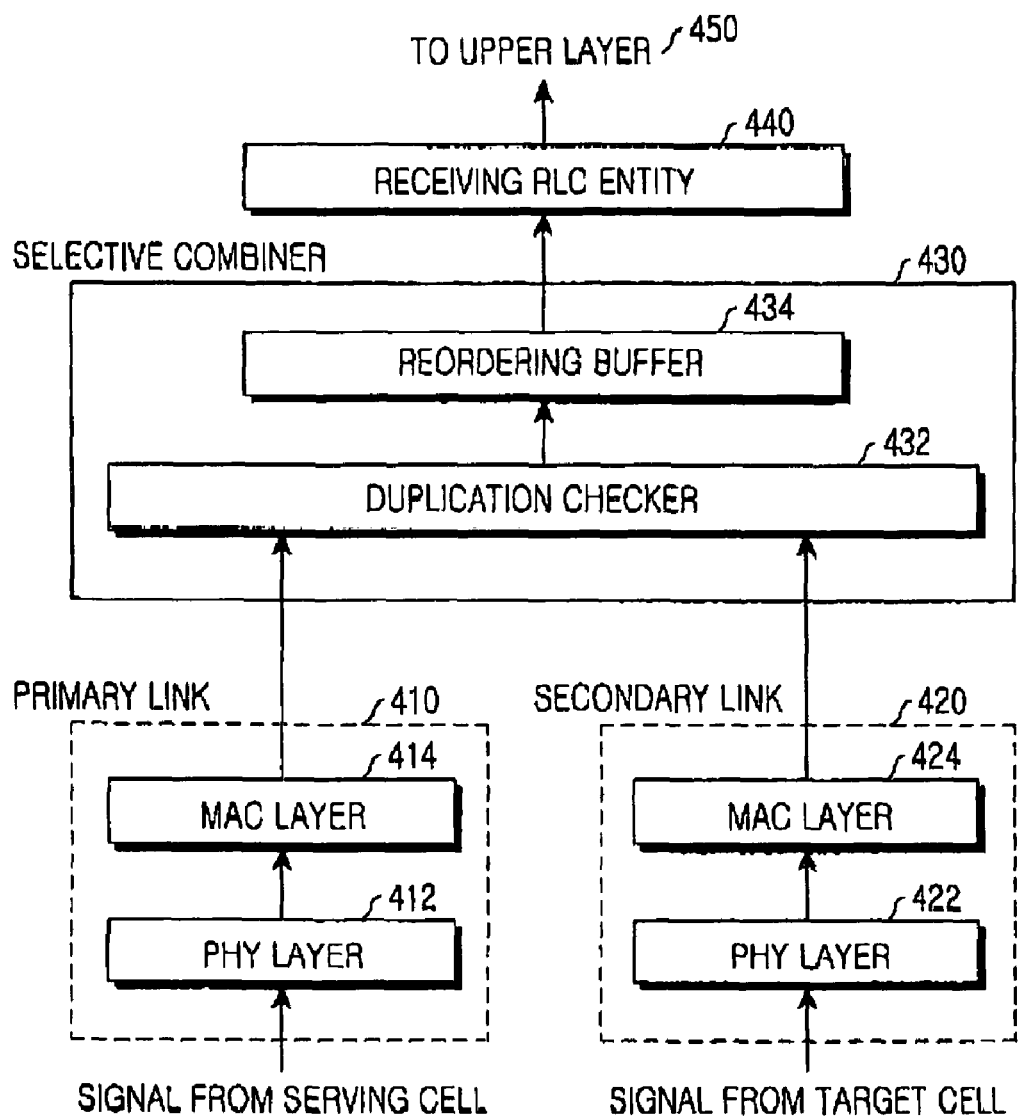
FIG. 4 is a block diagram illustrating a UE according to the first embodiment of the present invention.

FIG. 4 is a block diagram illustrating a UE according to an embodiment of the present invention. It is assumed in FIG. 4 that the UE has a selective combiner for selective combining. However, in a situation in which selective combining is not performed due to the existence of only a primary link to a serving cell, the UE structure will have only the structure required for processing a signal received from the serving cell. Therefore, the UE is formed of only a primary link 410 including a physical layer 412 and a MAC layer 414, and an RLC layer 440. Thereafter, if the UE desires to newly receive, even from a target cell, the same MBMS service as the MBMS service being provided from the serving cell, the UE forms a secondary link to the target cell. FIG. 4 illustrates the UE structure in which the secondary link is formed.

Referring to FIG. 4, the UE acquires physical layer information and MAC layer information through an MCCH from a target cell to which its secondary link is to be set up. Thereafter, the UE sets up a new physical layer 422 based on the physical layer information, and sets up a new MAC layer 424 based on the MAC layer information. The setup of the physical layer 422 and the MAC layer 424 indicate the setup of a new secondary link. Also, the UE sets up a selective combiner 430 according to an embodiment of the present invention. Thereafter, the UE connects the primary link 410 and the secondary link 420 to its lower layer, and connects the RLC layer 440 to its upper layer.

The selective combiner 430 includes a duplication checker 432 and a reordering buffer 434. The selective combiner 430 discards duplicate PDUs received through the primary link 410 and the secondary link 420, reorders the remaining PDUs in the order of their transmission, and transmits the reordered PDUs to the RLC layer 440. That is, the same PDUs can be received through the primary link 410 and the secondary link 420. In this case, the duplication checker 432 included in the selective combiner 430 discards one of the PDU received through the primary link 410 and the PDU received through the secondary link 420, and outputs only the remaining one PDU. It is not necessary such that the PDUs output from the duplication checker 432 have the same order as their transmission order. Therefore, the PDUs output from the duplication checker 432 are temporarily stored in the reordering buffer 434 in which they are reordered in the order of their transmission and then transmitted to the RLC layer 440.

In order for the duplication checker 432 to determine if the PDU provided from the primary link 410 and the PDU provided from the secondary link 420 duplicate each other, it requires separate information. An SN of the PDU can be used as the required information. However, it is not necessary such that PDUs having the same SN are duplicate PDUs for the following reason. The SN is assigned at stated periods, and if a delay difference between the PDU provided through the primary link 410 and the PDU provided through the secondary link 420 exceeds one period, it cannot be regarded that the two PDUs are duplicate PDUs. Determining whether the PDUs duplicate each other can be achieved based on an SN version.

As defined above, the SN version is a value, which varies according to the period. Therefore, if the PDUs have the same SN but have different SN versions, it cannot be determined that they are duplicate PDUs. In order to solve this problem, the present invention proposes an extended SN as separate information for checking the duplicity. The extended SN is defined as shown in Equation (1):

$$\text{Extended } SN\_x = [SN \text{ version}\_x || SN\_x] \qquad (1)$$

As shown in Equation (1), an extended SN 'extended SN_x' of a PDU provided through a link x is a value determined by concatenating an SN version 'SN version_x' for the link x to an SN 'SN_x' for the link x. For example, an SN version of a primary link is '001' and an SN of a PDU received through the primary link is '0000111', then the extended SN becomes '0010000111'.

Therefore, the duplication checker 432 calculates extended SNs for the PDU provided from the primary link 410 and the PDU provided from the secondary link 420, respectively, and compares the extended SNs, thereby checking duplicity. However, SNs of the PDUs are not replaced with the extended SNs. The extended SNs are used only for determining the order of the PDUs received from the primary link 410 and the secondary link 420.

Detailed Selective Combining Operation in UE

A detailed description will now be made of operations of the duplication checker and the reordering buffer for selective combining in a UE according to an embodiment of the present invention.

Operation of Duplication Checker

The duplication checker 432 discards PDUs duplicately received through a primary link and a secondary link, or determines permanently-not-received PDUs (hereinafter referred to as "permanently-missing PDUs"). That is, the duplication checker 432 transmits only one of PDUs received from the primary link and the secondary link to an upper layer, and discards the remaining PDUs. The PDUs can be received with a predetermined time delay. Further, the duplication checker 432 determines permanently missing PDUs that are not received through any one of the primary link and the secondary link, and reports the permanently missing PDUs to the upper layer. There are several possible methods for realizing the operation of the duplication checker 432. The following description can be one of the possible methods.

A definition of the parameters used in the following description will be given below.

V[Delivered]: This is the largest value among SNs of PDUs delivered to the reordering buffer 434, and will be represented herein by V[D] for simplicity.

S[Not Received]: This is an SN set of first-missing PDUs (hereinafter referred to as "missing PDUs") from any one of the primary link and the secondary link, and will be represented herein by S[NR] for simplicity. The S[NR] is first initialized to an empty set. Thereafter, if any missing PDU occurs from the primary link or the secondary link, it is determined whether the missing PDU has ever been delivered to the reordering buffer 434 before a corresponding point of time. If the missing PDU has never been delivered to the reordering buffer 434, an RLC SN of the missing PDU is registered in S[NR]. However, if the missing PDU has been previously delivered to the reordering buffer 434, the missing PDU is disregarded.

If an SN of the missing PDU is already registered in S[NR], an SN of the missing PDU is erased from S[NR] because it the missing PDU is a PDU missing from both the primary link and the secondary link. Finally, if a PDU having an SN registered in S[NR] is normally received through the remaining link, an SN of the normally received PDU is erased from S[NR].

S[Missing]: This is an SN set of all missing PDUs that were not normally received from any one of the primary link and the secondary link, and will be represented herein by S[M] for simplicity. That is, the SN registered in S[M] is an SN erased from S[NR] because its PDU is missing from both the primary link and the secondary link.

Upon receiving a first PDU through the newly formed secondary link, the duplication checker 432 initializes V[D] to an SN of a PDU that was last received from the primary link and delivered to the reordering buffer 434. Instead of performing the initialization of V[D] in a separate procedure, the duplication checker 432 can update V[D] with the highest SN among SNs of PDUs that have been received through the primary link and delivered to the upper layer before the secondary link is formed. Thereafter, the duplication checker 432 compares an SN of the PDU first received through the secondary link with the SN registered in V[D]. If the SN of the PDU is larger than the SN registered in V[D], the duplication checker 432 delivers the PDU to the reordering buffer 434. In this case, the V[D] is updated with an SN of the PDU delivered to the reordering buffer 434. Thereafter, if an PDU having an SN larger than the SN registered in V[D] is received through the primary link and the secondary link, the duplication checker 432 performs the same operation.

However, the duplication checker 432 determines if an SN of a first PDU received through the secondary link or an SN of a PDU later received through the primary link or the secondary link is equal to or smaller than the SN registered in V[D]. If the SN of the PDU is equal to or smaller than the SN registered in V[D], the duplication checker 432 determines if there is any SN that is identical to the SN of the PDU as an element of S[NR]. If there is no identical SN in the S[NR], the duplication checker 432 discards the PDU, determining that the PDU was duplicately received. This indicates that the same PDUs were duplicately received through the primary link and the secondary link.

However, if the SN of the PDU exists in the S[NR] as an element thereof, the duplication checker 432 delivers the PDU to the reordering buffer 434. Then the duplication checker 432 deletes the SN of the PDU, which exists in the S[NR] as an element thereof. This corresponds to the case in which the PDU was previously missing through any one of the primary link and the secondary link, but the missing PDU was received later through the remaining link.

If any missing PDU occurs through the primary link or the secondary link, the duplication checker 432 determines if the SN of the missing PDU exists in the S[NR] as an element thereof. If the SN of the missing PDU exists in the S[NR] as an element thereof, the duplication checker 432 deletes the SN of the missing PDU from the S[NR]. Thereafter, the duplication checker 432 registers the SN of the missing PDU in S[M] as an element thereof, and reports the SN registered in the S[M] as an element to the reordering buffer 434 such that the reordering buffer 434 can refer to the report in reordering the received PDUs. The duplication checker 432 deletes the SN reported to the reordering buffer 434 from the S[M]. This corresponds to the case in which the corresponding PDU is missing from both the primary link and the secondary link. However, if the SN of the missing PDU does not exist in the S[NR] as an element thereof, the duplication checker 432 registers the SN of the missing PDU in the S[NR] as an element thereof.

The duplication checker 432 regards the following situations as the missing of the corresponding PDU.

First, in a situation where for each link, a difference between an SN of a PDU received at a specific time and an SN of a previously-received PDU is larger than 1, the duplication checker 432 regards a PDU having a reception-failed SN as a missing PDU. For this, the duplication checker 432 should manage an SN of a previously received PDU for each link.

For example, if an SN of a PDU received from a primary link at a specific time is 13 but an SN of a previously-received PDU is 10, the duplication checker 432 regards a PDU with an SN=11 and a PDU with an SN=12 as missing PDUs.

Alternatively, there is another possible method for managing SNs of PDUs to be received. For example, if an SN of a PDU received from a primary link at a specific time is 10 but an SN of a successively-received PDU is 13, the duplication checker 432 can regard a PDU with an SN=11 and a PDU with an SN=12 as missing PDUs.

Second, the duplication checker 432 can determine missing PDUs by taking both a primary link and a secondary link into consideration at a time when a PDU is first received through the secondary link. That is, when an SN of a PDU first received through the secondary link, after initialization of V[D] is larger than an initial value of V[D], the duplication checker 432 regards PDUs having SNs existing between the initial value of V[D] and the SN of the first PDU as missing PDUs.

For example, if the V[D] is initialized to 5 and an SN of a PDU first received through the secondary link is 10, the duplication checker 432 regards PDUs with SNs=6, 7, 8 and 9 as missing PDUs. This indicates that a situation in which the PDU transmitted by the secondary link goes 5 PDUs ahead of the PDU transmitted by the primary link. However, a difference between an initial value of the V[D] and an SN of the first PDU is not larger than 1, the duplication checker 432 regards that there is no missing PDU.

Operation of Reordering Buffer

The reordering buffer 434 according to an embodiment of the present invention reorders PDUs delivered from the duplication checker 432 in the order of SN, and delivers the PDUs to an upper layer according to a predetermined rule. A detailed description of the operation of the reordering buffer 434 will be made below.

The reordering buffer 434 stores PDUs delivered from the duplication checker 432 in the order of SN. Thereafter, the reordering buffer 434 checks SNs of the stored PDUs.

As a result of the SN check, the reordering buffer 434 regards PDUs corresponding to an SN gap as missing PDUs. The reordering buffer 434 stores the smallest SN among SNs of the missing PDUs in a parameter V[First Gap]. When the V[First Gap] is determined, the reordering buffer 434 delivers PDUs having SNs smaller than V[First Gap] to the upper layer.

After delivering the corresponding PDUs, the reordering buffer 434 updates the V[First Gap] with a new SN. For the update of the V[First Gap], the foregoing criteria are equally applied. When the V[First Gap] is updated, the reordering buffer 434 delivers PDUs having SNs smaller than the updated V[First Gap] to the upper layer. The update of V[First Gap] is limited to the case where a PDU corresponding to V[First Gap] is received and the case where it is informed that a PDU corresponding to V[First Gap] is a permanently missing PDU.

As described above, the duplication checker 432 delivers only one of duplicately received PDUs among PDUs received from the primary link and the secondary link to the reordering buffer 434, and discards the remaining PDUs. Further, the duplication checker 432 determines a permanently missing PDU and reports the permanently missing PDU to the reordering buffer 434. If the PDUs delivered by the duplication checker 432 are in good order, the reordering buffer 434 delivers the PDUs to the upper layer, thereby obtaining a selective combining gain without affecting an operation of an RLC layer.

Example of Selective Combining

Figure 5:
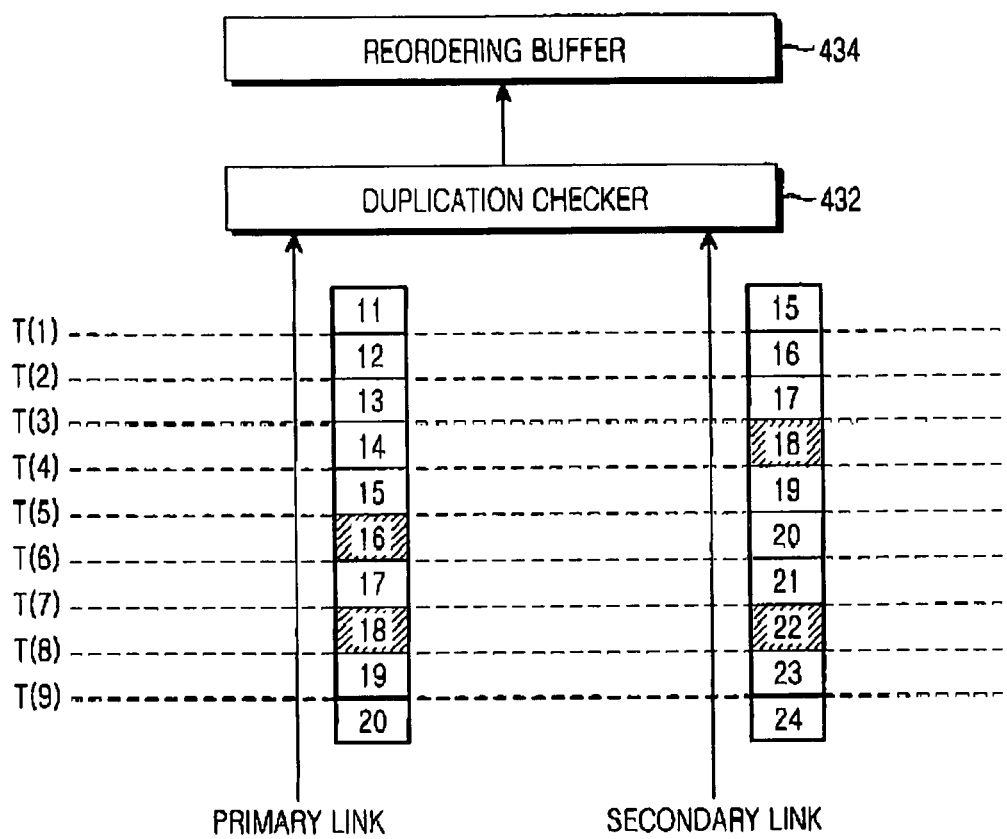
FIG. 5 is a diagram illustrating an operation of the selective combiner illustrated in FIG. 4.

FIG. 5 is a diagram illustrating an operation of a UE selective combiner for performing selective combining according to an embodiment of the present invention, by way of example. It is assumed herein that PDUs with SNs=11, 12, 13, 14, 15, 16, 17, 18, 19, and 20 are sequentially received through a primary link at reception times T(1) to T(9), respectively, and PDUs with SNs=15, 16, 17, 18, 19, 20, 21, 22, 23, and 24 are sequentially received through a secondary link at reception times T(1) to T(9), respectively. Also, it is assumed that the secondary link is set up at time T(0) and V[D] is initialized to 10 at the time T(0).

Referring to FIG. 5, a duplication checker 432 receives a PDU with an SN=11 (hereinafter referred to as "SN(11)") through a primary link and a PDU with an SN=15 (hereinafter referred to as "SN(15)") through a secondary link at time T(1). Thereafter, the duplication checker 432 updates V[D] with 15, and registers SNs=12, 13, and 14 existing between 11 and 15 in S[NR]. The duplication checker 432 delivers the SN(11) and the SN(15) to a reordering buffer 434. The reordering buffer 434 sets V[First Gap] to 12, and delivers the SN(11) representative of a PDU having an SN smaller than the V[First Gap] to an RLC layer.

At time T(2), the duplication checker 432 receives an SN(12) through the primary link and an SN(16) through the secondary link. The duplication checker 432 updates the V[D] with 16 based on an SN received through the secondary link, and deletes 12, which is an element of the S[NR], based on an SN received through the primary link. Thereafter, the duplication checker 432 delivers the SN(12) and the SN(16) to the reordering buffer 434. The reordering buffer 434 updates the V[First Gap] with 13, and delivers the SN(12) to an upper layer.

At time T(3), the duplication checker 432 receives an SN(13) through the primary link and an SN(17) through the secondary link. The duplication checker 432 updates the V[D] with 17 based on an SN received through the secondary link, and deletes 13, which is an element of the S[NR], based on an SN received through the primary link. Thereafter, the duplication checker 432 delivers the SN(13) and the SN(17) to the reordering buffer 434. The reordering buffer 434 updates the V[First Gap] with 14, and delivers the SN(13) to the upper layer.

At time T(4), the duplication checker 432 receives an SN(14) through the primary link and fails to receive a PDU through the secondary link. The duplication checker 432 maintains the V[D] at 17, and deletes 14, which is an element of the S[NR], based on an SN received through the primary link. Thereafter, the duplication checker 432 delivers the SN(14) to the reordering buffer 434. The reordering buffer 434 updates the V[First Gap] with 18, and delivers the SN(14), SN(15), SN(16), and SN(17) to the upper layer.

At time T(5), the duplication checker 432 receives an SN(15) through the primary link and an SN(19) through the secondary link. The duplication checker 432 updates the V[D] with 19 based on an SN received through the secondary link, and registers 18 in the S[NR] based on the SN, which was reception-failed at T(4). Because an SN of the SN(15) received through the primary link is smaller than the V[D] and is not an element of the S[NR], it can be determined that the corresponding PDU is a duplicately received PDU. Therefore, the duplication checker 432 discards the SN(15) instead of delivering it to the reordering buffer 434. The SN(19) is delivered to the reordering buffer 434. The SN(19) is stored in the reordering buffer 434 until an SN(18) corresponding to the V[First Gap] is received.

At time T(6), the duplication checker 432 fails to receive a PDU through the primary link and receives an SN(20) through the secondary link. The duplication checker 432 updates the V[D] with 20 based on an SN received through the secondary link, and delivers the SN(20) to the reordering buffer 434.

At time T(7), the duplication checker 432 receives an SN(17) through the primary link and an SN(21) through the secondary link. The duplication checker 432 updates the V[D] with 21 based on an SN received through the secondary link, and discards the SN(17), regarding it as a duplicately received PDU. The SN(21) is delivered to reordering buffer 434. The duplication checker 432 determines that the SN(16) is a missing PDU, at time T(7). However, because the SN(16) was already received through the secondary link and delivered to the upper layer, it is discarded instead of being registered in the S[NR].

At time T(8), the duplication checker 432 fails to receive any PDU through the primary link and the secondary link.

At time T(9), the duplication checker 432 receives an SN(19) through the primary link and an SN(23) through the secondary link. The duplication checker 432 updates the V[D] with 23 based on an SN received through the secondary link, and discards the SN(19) received through the primary link because it has already been delivered to the upper layer. The SN(23) is delivered to the reordering buffer 434 and stored therein. The duplication checker 432 determines at time T(9) that the SN(18) is a missing PDU based on an SN received through the primary link. Because the SN(18) is already registered in the S[NR] at the corresponding time, the duplication checker 432 deletes 18 from the S[NR] and then registers 18 in S[M] as a new element. Because a new element is registered in the S[M], the duplication checker 432 informs the reordering buffer 434 that a PDU with an SN=18 is a permanently missing PDU. Thereafter, the duplication checker 432 erases 18 registered in the S[M]. After being informed that the SN(18) is a permanently-missing PDU, the reordering buffer 434 updates the V[First Gap] with 22 representative of a position of the next missing PDU, and delivers SN(19), SN(20) and SN(21), which are PDUs having SNs smaller than 22, to the upper layer.

B. Second Embodiment

In the first embodiment of the present invention, a description has been made of an operation of a UE and an operation of a network where entities for forming data to be subject to selective combining, in an appropriate size, and then assigning an SN to the data, are separately provided to cells. In the first embodiment, the entity for forming data in an appropriate size and then assigning an SN to the data refers to an RLC layer. Herein, the entity for forming data in an appropriate size and then assigning an SN to the data will be referred to as a "sequence number assigning device," for simplicity.

From a network's point of view, another method for providing selective combining forms only one sequence number assigning device and enables cells for permitting selective combining to share the device. The present invention proposes a method for managing an SN version by a network in a situation in which several cells share one sequence number assigning device. For reference, the case where sequence number assigning devices are separately formed for respective cells is equal in operation of a UE to the case where one sequence number assigning device is shared by several cells. Therefore, the following description will be limited to an operation of the network.

Figure 6:
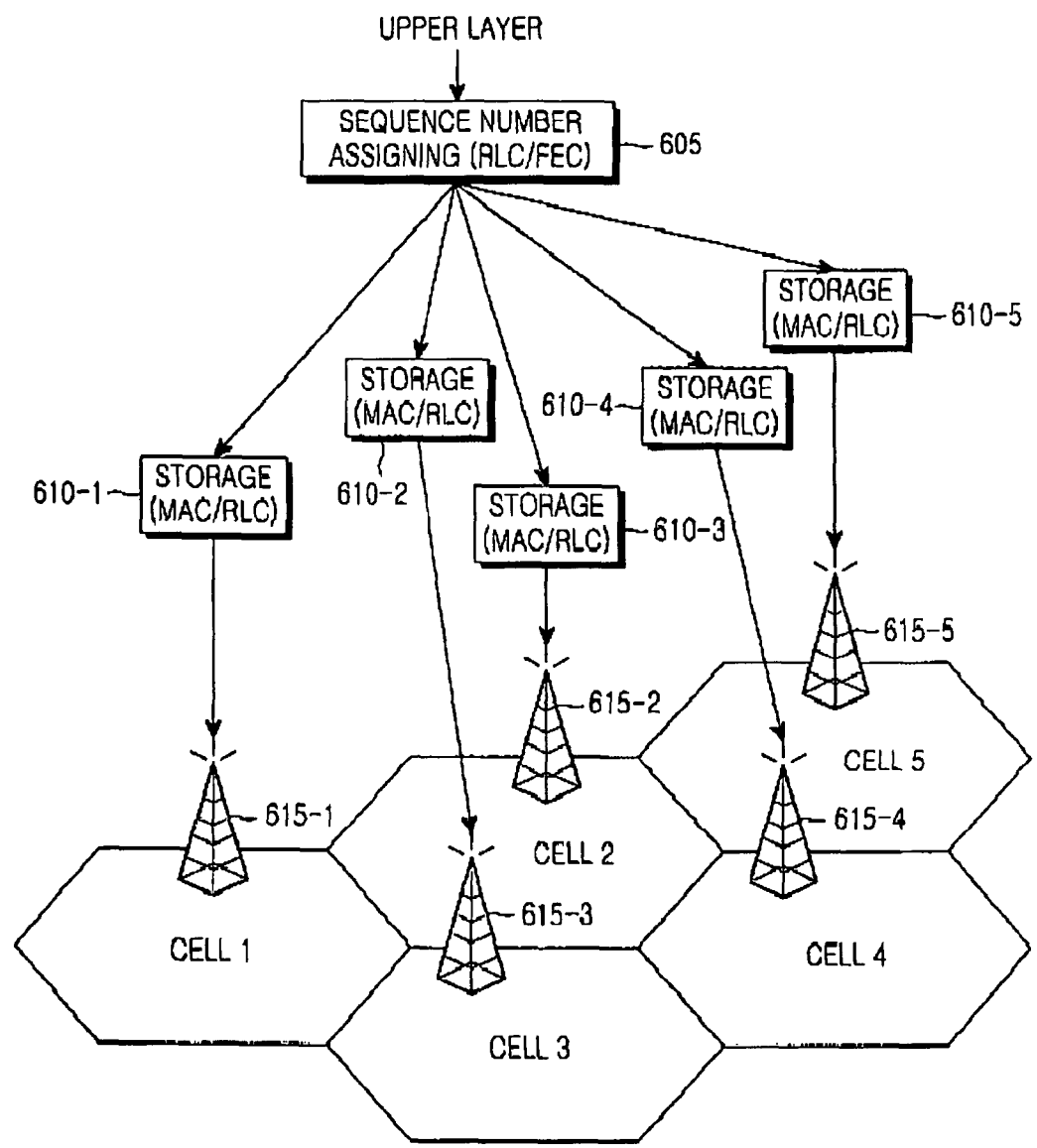
FIG. 6 is a diagram illustrating an example of a network in which only one sequence number assigning device is formed, to which a second embodiment of the present invention is to be applied.

FIG. 6 is a diagram illustrating an example of a network in which only one sequence number assigning device is formed. For example, a particular MBMS service is being provided in a cell#1 615-1 a cell#2 615-2, a cell#3 615-3, a cell#4 615-4,-and a cell#5 615-5, and an RNC forms one sequence number assigning device 605 and storage devices 610-1, 610-2, 610-3, 610-4, and 610-5 associated with the cells, to provide the MBMS service.

The sequence number assigning device 605 can be an RLC layer as in the first embodiment. In the sequence number assigning device 605, data assigned an SN is separately transmitted for respective cells. Before being separately transmitted for the respective cells, the data is stored in their associated storage devices 610-1, 610-2, 610-3, 610-4, and 610-5. An entity for storing data before transmitting the data separately for the respective cells can be a MAC layer. The data stored in the storage devices 610-1, 610-2, 610-3, 610-4, and 610-5 is transmitted separately for the respective cells at an appropriate time. Therefore, even the data packets that were assigned SNs through only one sequence number assigning device 605 can be different in their transmission time for respective cells.

When one sequence number assigning device 605 provides data to several storage devices 610-1, 610-2, 610-3, 610-4, and 610-5 as illustrated in FIG. 6, SN version information is managed in the storage devices 610-1, 610-2, 610-3, 610-4, and 610-5, separately formed for the respective cells.

Each of the storage devices 610-1, 610-2, 610-3, 610-4, and 610-5, which provides data to its associated cell, initially sets an SN version to '0'. Thereafter, the storage device stores the number of PDUs transmitted to the cell in a parameter N[PDU]. The N[PDU] increases between 0 to 127, and returns to 0 after 127. If the SN has a different value, a value of the N[PDU] is also adjusted according thereto. When the N[PDU] returns to 0 from 127, the storage device increases the SN version by 1. That is, the SN version increases by 1 when the N[PDU] returns to 0 from its maximum value. The storage device periodically transmits the SN version over an MCCH.

A selective combining operation proposed in the present invention is available only for the cells having the same sequence number assigning devices. However, the current standard has not specified a method in which a UE is provided with data from which sequence number assigning device. Therefore, the present invention proposes a method for defining a new parameter, called a "sequence number assigning device indicator," and periodically transmitting the parameter for each cell.

Figure 7:
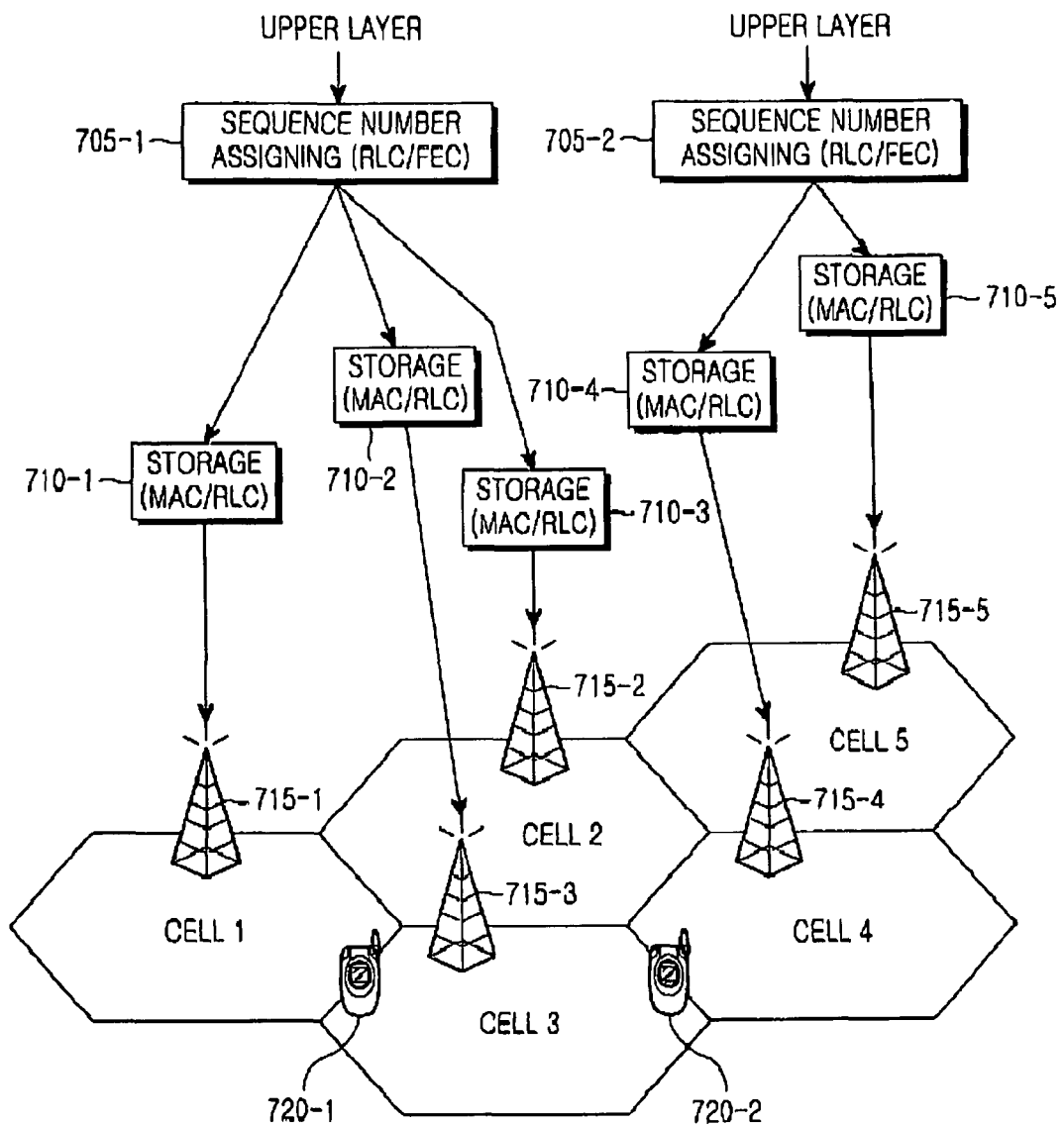
FIG. 7 is a diagram illustrating an example of a network including a plurality of sequence number assigning devices, to which the second embodiment of the present invention is to be applied.

FIG. 7 is a diagram illustrating an example of a network including a plurality of sequence number assigning devices, wherein the network periodically transmits a sequence number assigning device indicator for each cell. Referring to FIG. 7, a particular sequence number assigning device 705-1 is providing data to a cell#1 715-1, a cell#2 715-2, and a cell#3 715-3, and another sequence number assigning device 705-2 is providing data to a cell#4 715-4 and a cell#5 715-5. The network assigns unique indicators to the sequence number assigning devices 705-1 and 705-2. Here, the indicators assigned to the sequence number assigning devices should not overlap each other. For example, a size (length) of a sequence number assigning device indicator can be about 5 bits. An operation of assigning an indicator to each of the sequence number assigning devices 705-1 and 705-2 can be performed by an operator using O&M (Operation and Management).

The network periodically transmits the sequence number assigning device indicators for respective cells, such that a UE determines whether to perform selective combining. For example, if a UE#1 720-1 recognizes that a sequence number assigning device indicator of the cell#1 715-1 is identical to a sequence number assigning device indicator of the cell#3 715-3, it sets up a secondary link to the cell#1 715-1 or the cell#3 715-3 and attempts selective combining. If a UE#2 720-2 recognizes that a sequence number assigning device indicator of the cell#3 715-3 is different from a sequence number assigning device indicator of the cell#4 715-4, it does not attempt selective combining. That is, a UE moving between the cells, from which it is assigned sequence numbers by different sequence number assigning devices, does not perform selective combining proposed in the present invention. However, a UE moving between the cells, from which it is assigned sequence numbers by the same sequence number assigning devices, performs selective combining proposed in the present invention.

Figure 8:
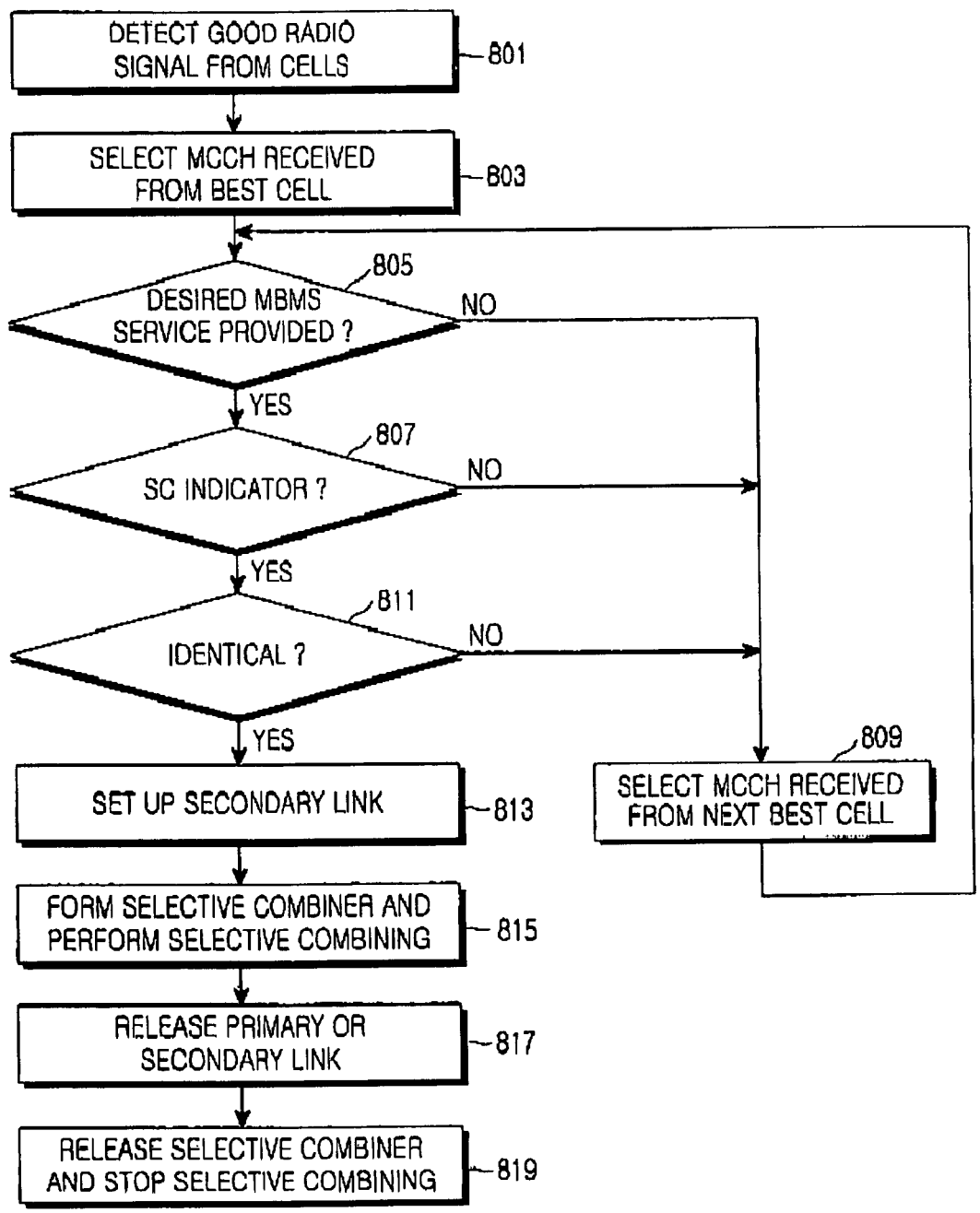
FIG. 8 is a flowchart illustrating an operation of a UE in the network having the structure illustrated in FIG. 7.

FIG. 8 is a flowchart illustrating an operation of a UE in the network having the structure illustrated in FIG. 7. An operation of a UE illustrated in FIG. 8 is substantially identical to an operation of a UE according to the first embodiment, described in connection with FIG. 3. The only difference being that in FIG. 8, the UE determines whether to perform selective combining, depending on if a sequence number assigning device indicator of a target cell is identical to a sequence number assigning device indicator of a serving cell. It is assumed in FIG. 8 that a radio link is set up between a UE and a serving cell, and a particular MBMS service is being provided through the radio link.

Referring to FIG. 8, in step 801, a UE receives signals from neighbor cells and detects a good signal from the received signals.

Assuming that the number of target cells is plural, in step 803, the UE receives MCCHs from the target cells, and selects an MCCH from a target cell from which the best signal is received. The MCCH is used for transmitting indicators for an MBMS service provided from the target cell, radio bearer information of the MBMS service, and selective combining assistance information. After detecting information received over the selected MCCH, the UE proceeds to step 805. In step 805, the UE determines if its desired MBMS service is being provided by the target cell. If its desired MBMS service is being provided, the UE proceeds to step 807. Otherwise, if its desired MBMS service is not being provided, the UE proceeds to step 809.

In step 807, the UE determines if the target cell supports selective combining based on an SC indicator in the selected combining assistance data. If it is determined from the SC indicator that the target cell supports selective combining, the UE proceeds to step 811. Otherwise, if it is determined that the target cell does not support selective combining, the UE proceeds to step 809.

In step 811, the UE compares a sequence number assigning device indicator acquired from the serving cell with a sequence number assigning device indicator acquired from the target cell. If the sequence number assigning device indicator acquired from the serving cell is identical to the sequence number assigning device indicator acquired from the target cell, the UE proceeds to step 813. However, if the sequence number assigning device indicator acquired from the serving cell is not identical to the sequence number assigning device indicator acquired from the target cell, the UE proceeds to step 809.

In step 809, the UE selects an MCCH from a target cell from which the next best signal is received, detects information received over the selected MCCH, and then returns to step 805.

In step 813, the UE sets up a radio link, i.e., a secondary link, to the target cell in order to receive its desired MBMS service. The secondary link is set up based on the radio bearer information received over the MCCH. The radio bearer information includes physical channel information and MAC layer information. The physical layer information is information on a transport channel, and includes code information for a physical channel, the type of channel coding applied to the physical channel, a channel coding rate, and a transmission time interval (TTI). The MAC layer information includes multiplexing information for indicating if multiplexing is applied in a MAC layer, and service ID information for indicating if a service ID is used in the MAC layer. The UE sets up a new physical layer based on the physical layer information, and sets up a new MAC layer based on the MAC layer information. As indicated above, the secondary link is the newly set-up physical layer and MAC layer.

After completing setup of the secondary link, the UE forms a selective combiner for selective combining in step 815. Thereafter, the UE connects the selective combiner to the primary link and the secondary link, and performs selective combining on broadcast data received through the primary link and the secondary link.

In step 817, the UE continuously monitors if the primary link or the secondary link needs to be released. The primary link or the secondary link needs to be released when a signal whose level is lower than a threshold is received. Upon detecting this situation, the UE releases a link to the corresponding cell.

For example, if a level of the signal received through the primary link is lower than a desired level, the UE releases the primary link. However, if a level of the signal received through the secondary link is lower than a desired level, the UE releases the secondary link. If it is determined in step 817 that only one link exists, the UE proceeds to step 819 where it release the formed selective combiner, thereby completing the selective combining operation.

C. Third Embodiment

Figure 9:
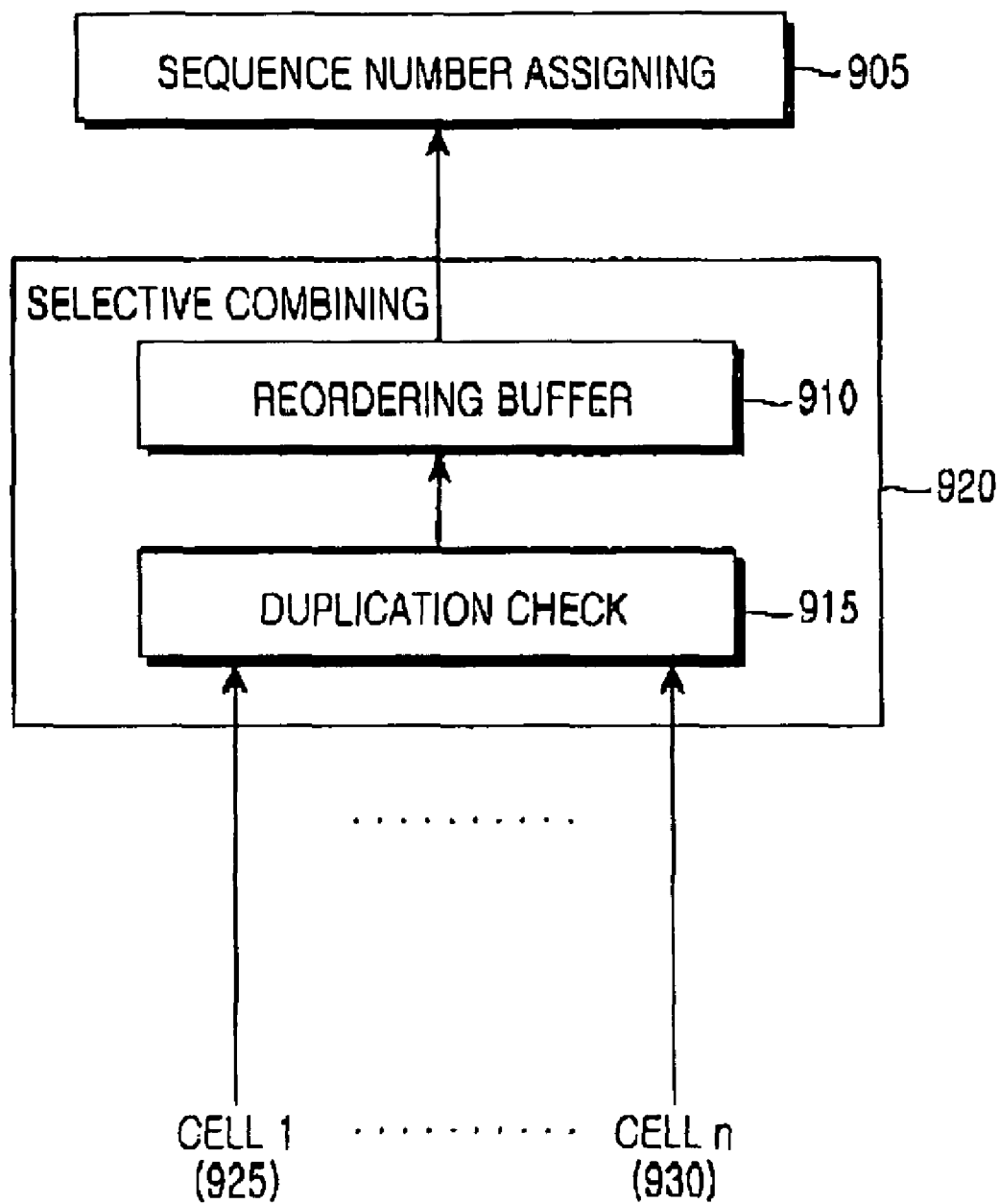
FIG. 9 is a block diagram illustrating a UE according to a third embodiment of the present invention.

FIG. 9 is a block diagram illustrating a UE according to another embodiment of the present invention. It is assumed in FIG. 9 that when data is received from a plurality of links, a selective combiner is formed for selective combining. Here, the "selective combining" refers to a technique for receiving data through a plurality of cells (or links), thereby decreasing possibility of data loss. Therefore, the number of cells (or links) through which a UE receives data does not affect an operation of the UE. For simplicity, it is assumed herein that the UE receives data from only 2 cells.

Referring to FIG. 9, a selective combiner 920 includes a duplication checker 915 and a reordering buffer 910. The duplication checker 915 is connected to a plurality of links 925 and 930. The reordering buffer 910 is connected to a sequence number assigning device 905.

Detailed Selective Combining Operation in UE

A detailed description will now be made of operations of the duplication checker and the reordering buffer for selective combining in a UE according to an embodiment of the present invention.

Parameters Managed by Duplication Checker

The duplication checker 915 manages the following parameters for each cell to which a link is set up. Herein, the UE sets up links to n cells, and the respective cells are represented by c_1 925, . . . , c_n 930.

Parameters managed by the duplication checker 915 for a particular cell x includes:

VR[c_x]: This is an SN of a PDU expected to be received next, and has a value determined by adding 1 to an SN of a PDU last received from a cell x.

VM[c_x]: This is a set of SNs of PDUs not received from a cell x.

Parameters managed by the duplication checker 915 commonly for all cells include:

VD: This is a set of SNs of PDUs delivered to the reordering buffer 910 by the duplication checker 915. This is used for duplication check.

Highest-delivered_SN: This represents the highest SN among SNs of PDUs delivered to the reordering buffer 910 by the duplication checker 915.

Permanently_missing_SN: This is a set of SNs of permanently missing PDUs.

Parameter Managed by Reordering Buffer

A parameter managed by the reordering buffer 910 includes:

First_missing_SN: The reordering buffer 910 regards PDUs corresponding to an SN gap as missing PDUs, and stores, in this parameter, an SN of a missing PDU having the lowest SN (or an SN of a missing PDU corresponding to the earliest gap) among the missing PDUs.

Operation of Duplication Checker

The duplication checker 915 manages respective parameters and performs duplication check in the following manner. In this embodiment, it is assumed that the selective combiner 920 is formed as soon as a primary link is set up. That is, when a UE sets up a physical layer, a MAC layer and an RLC layer to receive an MBMS service from a cell#1, it also sets up the selective combiner 920.

In the previous embodiment, the selective combiner 920 is formed, when the UE sets up a new link to another cell thereby increasing the number of its links to two or more. A difference derived from the two situations consists in an initialization operation of the V[D] or Highest_delivered_SN. That is, if a selective combiner exists even in a situation where there is only one link, the initialization of the V[D] described in the previous embodiment is not required.

The operating steps of each embodiment are listed herein below.

(1) The duplication checker 915 receives a PDU from a particular cell x.

(2) The duplication checker 915 compares an SN of the received PDU with VR[c_x].

(3) The duplication checker 915 proceeds to (4) if an SN of the received PDU is larger than VR[c_x], and proceeds to (5) if an SN of the received PDU is equal to VR[c_x].

(4) The duplication checker 915 adds SNs corresponding to values between an SN of the received PDU and VR[c_x] to VM[c_x]. An SN to be included in the VM[c_x] includes even the VR[c_x].

(5) The duplication checker 915 updates VR[c_x] with a value determined by adding 1 to an SN of the received PDU.

(6) The duplication checker 915 compares an SN of the received PDU with Highest-delivered_SN. If Highest_delivered_SN is larger than an SN of the received PDU, the duplication checker 915 proceeds to (7). Otherwise, the duplication checker 915 proceeds to (11).

(7) The duplication checker 915 updates Highest_delivered_SN with an SN of the received PDU.

(8) The duplication checker 915 delivers the received PDU to the reordering buffer 910.

(9) The duplication checker 915 adds an SN of the delivered PDU to VD.

(10) The duplication checker 915 ends the foregoing process, and waits until the next PDU is received.

(11) The duplication checker 915 determines whether an SN of the received PDU is included in VD. If an SN of the received PDU is included in VD, the duplication checker 915 proceeds to (12). However, if an SN of the perceived PDU is not included in VD, the duplication checker 915 proceeds to (14).

(12) The duplication checker 915 discards the received PDU.

(13) The duplication checker 915 ends the foregoing process, and waits until the next PDU is received.

(14) The duplication checker 915 delivers the received PDU to the reordering buffer 910.

(15) The duplication checker 915 adds an SN of the delivered PDU to VD.

(16) The duplication checker 915 ends the foregoing process, and waits until the next PDU is received.

A description will now be made of an operation in which the duplication checker 915 manages a parameter VM and checks a permanently missing PDU.

(1) The duplication checker 915 monitors SNs stored in parameters VMs managed for respective cells.

(2) If a particular SN is stored in all of the parameters VMs, the duplication checker 915 stores the corresponding SN in Permanently_missing_SN. For example, if a particular UE is receiving PDUs from a cell#1, a cell#2 and a cell#3, VM(c_1)= [10, 15, 18], VM(c_2)=[10, 13, 15], and VM(c_3)= [10, 15], then SN=10 and SN=15 are stored in Permanently_missing_SN.

(3) The duplication checker 915 reports the SNs stored in Permanently_missing_SN to the reordering buffer 910.

(4) The duplication checker 915 deletes the SNs reported to the reordering buffer 910 from Permanently_missing_SN.

(5) The duplication checker 915 deletes the SNs reported to the reordering buffer 910 from the parameters VMs.

Operation of Reordering Buffer

The reordering buffer 910 stores the PDUs delivered from the duplication checker 915 in the order of SN, and regards PDUs corresponding to a part where an increment of the SN is larger than 1, as missing PDUs. A detailed description of an operation of the reordering buffer 910 will be made herein below.

(1) A PDU delivered by the duplication checker 915 arrives at the reordering buffer 910.

(2) The reordering buffer 910 stores an SN of the received PDU in the order of SN.

(3) If an SN of the received PDU is equal to First_missing_SN, it indicates that a PDU corresponding to First_missing_SN is no longer a missing PDU. Therefore, the reordering buffer 910 updates First_missing_SN with an SN of a missing PDU having the lowest SN among the remaining missing PDUs.

(4) The reordering buffer 910 delivers PDUs having SNs lower than the updated First_missing_SN to an upper layer.

(5) If the duplication checker 915 reports SNs of the permanently missing PDUs, the reordering buffer 910 regards that the missing PDUs corresponding to the SNs have not been received.

(6) If one of the permanently missing PDUs is identical to First_missing_SN, it indicates that the PDU corresponding to First_missing_SN is no longer a missing PDU. Therefore, the reordering buffer 910 updates First_missing_SN with an SN of a missing PDU having the lowest SN among the remaining missing PDUs.

(7) The reordering buffer 910 delivers PDUs having SNs lower than the updated First_missing_SN to the upper layer.

D. Fourth Embodiment

A description will now be made of an operation of a selective combiner implemented with a reordering buffer and a duplication checker according to a fourth embodiment of the present invention.

Structure of UE

Figure 10:
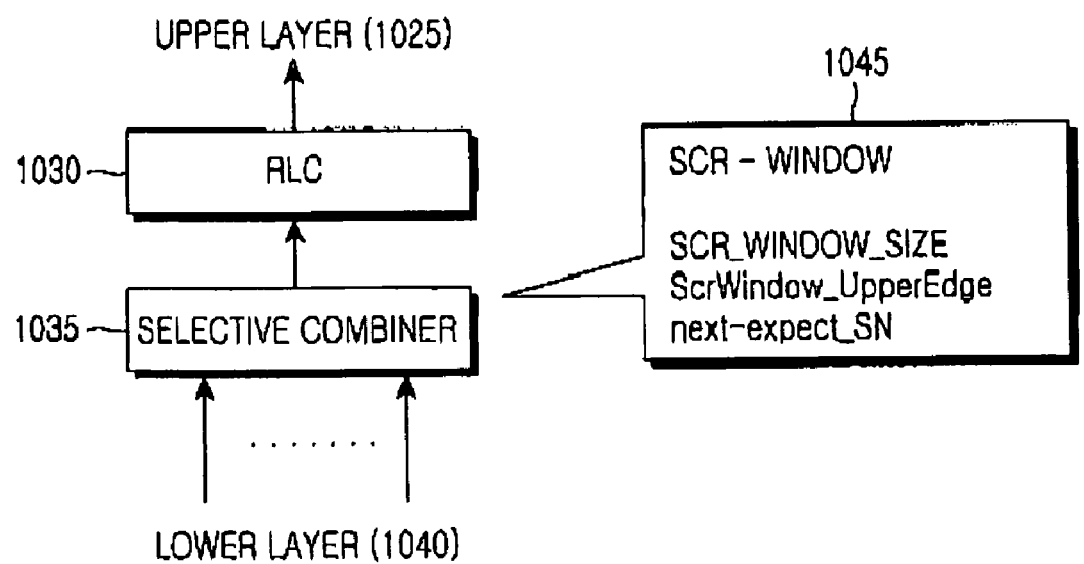
FIG. 10 is a block diagram illustrating an RLC entity in a UE according to a fourth embodiment of the present invention.

FIG. 10 is a block diagram illustrating an RLC structure of a UE wherein a selective combining function is included in an RLC entity according to a fourth embodiment of the present invention. Referring to FIG. 10, a selective combiner 1035 receives PDUs from a plurality of cells through a lower layer 1040. The selective combiner 1035 discards duplicate PDUs from the received PDUs, and reorders the remaining PDUs. The reordered PDUs are delivered to an RLC layer 1030.

The selective combiner 1035 manages an SCR-window in order to perform the foregoing operation. The SCR-window distinguishes the order of the received PDUs and manages PDUs stored in a reordering buffer. In order to perform an operation of the reordering buffer, the SCR-window manages parameters next_expect SN and ScrWindow_UpperEdge.

Structure and Operation of SCR-Window

Figure 11:
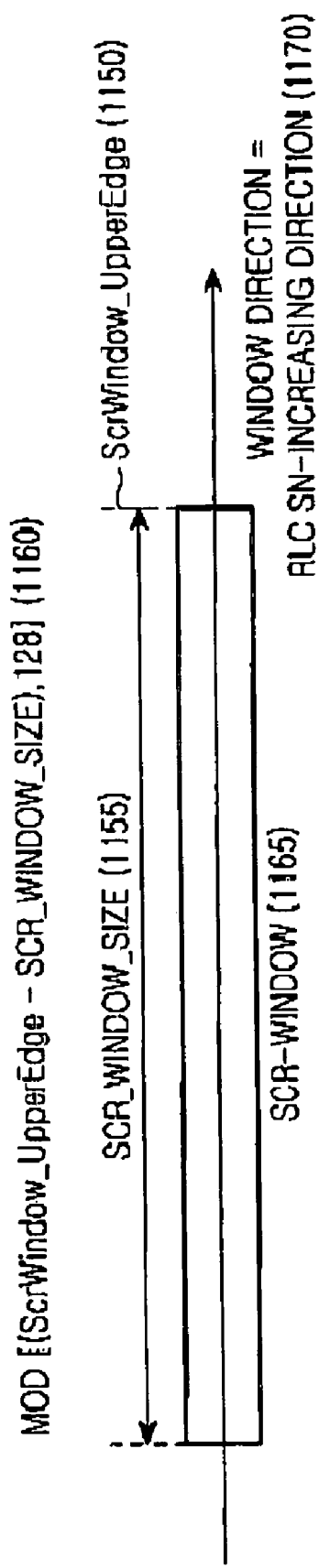
FIG. 11 is a diagram illustrating the SCR-window illustrated in FIG. 10.

FIG. 11 is a diagram illustrating a structure of the SCR-window. Referring to FIG. 11, an SCR-window 1165 includes an ScrWindow_UpperEdge 1150 and an SCR_WINDOW_SIZE 1155.

The ScrWindow_UpperEdge 1150 is the highest SN among SNs of PDUs that the UE has received up to now. Therefore, if an SN of a newly received PDU is higher than the existing ScrWindow_UpperEdge, ScrWindow_UpperEdge is updated with a new SN. That is, the ScrWindow_UpperEdge is updated with an SN of the newly received PDU.

The SCR_WINDOW_SIZE 1155 is a parameter that an RNC sets and announces to UEs. The SCR_WINDOW_SIZE 1155 indicates a possible maximum reception time difference between two neighbor cells. If an RNC has set SCR_WINDOW_SIZE between two unspecified cells to x and announced it to UEs, the RNC should set a reception time difference between the two cells such that the reception time difference should not exceed x PDUs.

The SCR-window 1165 is formed by an upper edge and a lower edge. In the SCR-window 1165, the ScrWindow_UpperEdge 1150 is defined as an upper edge. The lower edge is determined by a value obtained by performing a modulo-128 operation on (ScrWindow_UpperEdge—SCR_WINDOW_SIZE). The SCR-window 1165 progresses in the same direction each time the ScrWindow_UpperEdge 1150 is updated.

If an SN of a PDU received at a specific time is located within the SCR-window 1165, it is regarded that the SN of the PDU is smaller than the ScrWindow_UpperEdge 1150. If an SN of the received PDU is located outside the SCR-window 1165, it is regarded that the SN of the received PDU is larger than the ScrWindow_UpperEdge 1150.

For example, assuming that at a specified time, the ScrWindow_UpperEdge 1150 is 100 and the SCR_WINDOW_SIZE 1155 is 64, in the SCR-window 1165, an upper edge is 100 and a lower edge is 36. If a PDU with an SN=50 arrives after a lapse of time, the SN=50 is located within the SCR-window 1165. Therefore, the SN=50 is smaller than the ScrWindow_UpperEdge 1150 of 100.

If a PDU with an SN=30 arrives after a further lapse of time, the SN=30 is located outside the SCR-window 1165. Therefore, the SN=30 is larger than the ScrWindow_UpperEdge 1150 of 100. Therefore, the ScrWindow_UpperEdge 1150 is updated with 30, and a new lower edge of the SCR-window 1165 becomes 96, which is determined by performing a modulo-128 operation on −34.

If a PDU with an SN=120 has arrived after a further lapse of time, the SN=120 is located within the SCR-window 1165, so that the SN=120 is smaller than the ScrWindow_UpperEdge 1150.

As described above, the SCR-window 1165 shifts along with the update of the ScrWindow_UpperEdge 1150, and is used for determining if an SN of a received PDU is larger or smaller than the ScrWindow UpperEdge 1150. Only the PDUs having SNs within the SCR-window 1165 can be stored in a reordering buffer. For example, if a lower edge is 0 and an upper edge is 64 in the SCR-window 1165, only the PDUs having SNs between 0 and 64 are stored in the reordering buffer. The shift of the SCR-window 1165 causes a change in SNs of the PDUs stored in the reordering buffer.

A parameter next expect SN, another parameter used in the selective combiner, is a parameter in which an SN of a first missing PDU among missing PDUs is stored. That is, this parameter is the same parameter as V[First Gap] used in the first embodiment. An initial value of the ScrWindow_UpperEdge 1150 is a value, which is smaller by 1 than an SN of a PDU that the selective combiner first received. An initial value of the next_expect_SN is an SN of a PDU that the selective combiner first received.

Operation of Selective Combiner

Figure 12:
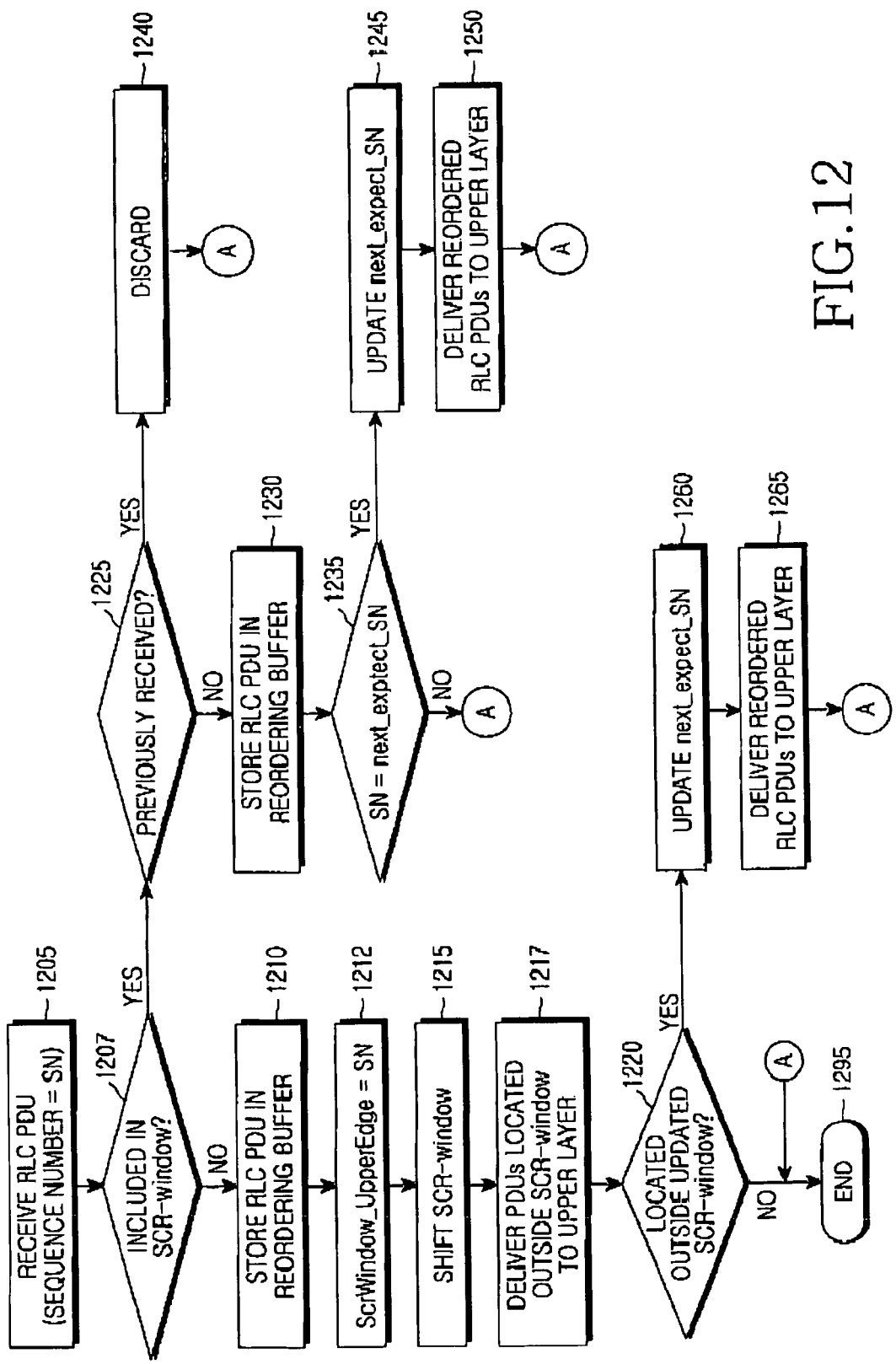
FIG. 12 is a flowchart illustrating an operation of a selective combiner according to the fourth embodiment of the present invention.

FIG. 12 is a flowchart illustrating an operation of a selective combiner according to the fourth embodiment of the present invention. More specifically, an operation of the selective combiner illustrated in FIG. 12 includes a process of forming or changing a window (or SCR-window), a process of storing broadcast data (or PDU) received by the window in a reordering buffer or delivering the broadcast data to an upper layer, and a process of updating an SN (or next_expect_SN) of missing broadcast data and then delivering the broadcast data stored in the reordering buffer to the upper layer.

Referring to FIG. 12, in step 1205, a selective combiner receives a particular PDU. In step 1207, the selective combiner determines if an SN of the received PDU is located within SCR-window. If the SN is located within the SCR-window, the selective combiner proceeds to step 1225. Otherwise, if the SN is not located within the SCR-window, the selective combiner proceeds to step 1210. That the SN is not located within the SCR-window indicates that the SN is larger than ScrWindow_UpperEdge.

In step 1210, the selective combiner stores the received PDU in a reordering buffer. Thereafter, in step 1212, the selective combiner updates the ScrWindow_UpperEdge with the SN. In step 1215, the selective combiner newly sets SCR-window based on the updated ScrWindow_UpperEdge. That is, the selective combiner updates the SCR-window by shifting a lower edge of the SCR-window by the shifted length of the ScrWindow_UpperEdge. For example, if it is determined in step 1207 that ScrWindow_UpperEdge is 10 and SN is 15, the ScrWindow_UpperEdge is shifted to 15 by 5. In step 1215, the lower edge of the SCR-window is also shifted by 5. That is, the upper edge of the SCR-window is shifted by 5.

In step 1217, the selective combiner delivers PDUs, whose SNs are located outside the new SCR-window, among the PDUs stored in the reordering buffer, to an upper layer. For example, it is assumed that a PDU with an SN=75 is stored in the reordering buffer. In this case, the SN=75 was located within the SCR-window (74 to 10) before it is shifted. However, the SN=75 is located outside the SCR-window (79 to 15) after it is shifted. Therefore, the PDU with an SN=75 is delivered to the upper layer. Here, that the PDU with an SN=75 is stored in the reordering buffer indicates that there is a PDU that the selective combiner previously failed to receive. Also, that SN=75 is located outside the SCR-window indicates that there is no possibility that the selective combiner will receive the reception-failed PDU. Therefore, the PDU with an SN=75 is delivered to the upper layer even though reordering is not completed.

In step 1220, the selective combiner determines if next-expect_SN is located outside the SCR-window. If the next-expect_SN is located outside the SCR-window, the selective combiner proceeds to step 1260. Otherwise, if the next_expect_SN is located within the SCR-window, the selective combiner proceeds to step 1295 where it waits until the next PDU arrives.

That the next-expect_SN is located within the SCR-window indicates that there is no possibility that the selective combiner will receive a missing PDU corresponding to the next_expect_SN. Therefore, the selective combiner should set a new_next_expect SN, and deliver PDUs having SNs smaller than the new next_expect_SN among the PDUs stored in the reordering buffer, to the upper layer. Steps 1260 and 1265 are provided for the foregoing operation.

In step 1260, the selective combiner updates next_expect_SN with an SN of a first missing PDU in the reordering buffer. For example, if missing PDUs with SNs=100, 120, and 10 are stored in the reordering buffer, the selective combiner updates next_expect_SN with 100.

Thereafter, in step 1265, the selective combiner delivers PDUs having SNs smaller than the next_expect_SN to the upper layer. These PDUs are successfully reordered PDUs. After completion of the delivery, the selective combiner proceeds to step 1295 where it ends all of the processes and waits until a new PDU arrives.

If it is determined in step 1207 that an SN of the received PDU is located within SCR-window, the selective combiner proceeds to step 1225.

In step 1225, the selective combiner determines if the PDU has been previously received. This can be done by determining if an SN of the PDU is already stored in the reordering buffer. That is, if a PDU with the SN is already stored in the reordering buffer, the selective combiner proceeds to step 1240 because it indicates that the PDU has been duplicately received. In step 1204, the selective combiner discards the duplicate PDU. Thereafter, the selective combiner proceeds to step 1295, where it ends all of the processes and waits until the next PDU arrives.

However, if a PDU with the SN is not stored in the reordering buffer, it indicates that the PDU is not a duplicate PDU. Therefore, the selective combiner proceeds to step 1230, where it stores the PDU in the reordering buffer.

In step 1235, the selective combiner determines if an SN of the received PDU is identical to next_expect_SN. If they are not identical to each other, the selective combiner proceeds to step 1295, where it ends all of the processes and waits until the next PDU arrives.

However, if an SN of the received PDU is identical to next_expect_SN, the selective combiner proceeds to step 1245. In step 1245, the selective combiner updates the next_expect_SN with an SN of a first missing PDU in the reordering buffer.

In step 1250, the selective combiner delivers PDUs with SNs smaller than the next_expect_SN to the upper layer. These PDUs are successfully reordered PDUs.

After step 1250, the selective combiner proceeds to step 1295 where it ends all of the processes and waits until a new PDU arrives.

As can be understood from the foregoing description, a selective combiner according to the present invention performs selective combining based on SNs, thereby obtaining a selective combining gain. Therefore, a UE can receive a higher-quality service with the same radio resource.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for combining broadcast data packets from a plurality of cells in a user equipment (UE), the method comprising the steps of:
   receiving a broadcast data packet supporting selective combining from the plurality of cells, respectively;
   if a sequence number of the received broadcast data packet does not fall within a reception window, storing the broadcast data packet in a buffer and updating the reception window based on the sequence number;
   if the sequence number of the received broadcast data packet falls within the reception window, determining if a broadcast data packet having the sequence number has previously been stored in the buffer;
   discarding the broadcast data packet, if the broadcast data packet has previously been stored in the buffer; and
   storing the broadcast data packet in the buffer, if the broadcast data packet has not previously been stored in the buffer,
   wherein the reception window is determined based on a foremost sequence number among sequence numbers of the broadcast data packets received, and a predetermined window size that is determined based on a maximum error range for reception points of broadcast data packets having a same sequence number, transmitted from different cells.

2. The method of claim 1, further comprising the step of delivering, to an upper layer, a broadcast data packet having a sequence number which is outside a range of the reception window due to the update of the reception window, among the broadcast data packets stored in the buffer.

3. The method of claim 1, further comprising the steps of:
   reordering broadcast data packets stored in the buffer in the order of sequence number; and
   delivering, to an upper layer, a broadcast data packet having a sequence number preceding a reception-failed sequence number, wherein a reception-failed sequence number is a sequence number for which the corresponding broadcast data racket is missing.

4. An apparatus for combining broadcast data packets from a plurality of cells in a user equipment (UE), the apparatus comprising:
   a buffer; and
   a selective combiner for storing a received broadcast data packet supporting selective combining in the buffer, if a sequence number of the broadcast data packet respectively received from the plurality of cells does not fall within a reception window, and storing the received broadcast data packet in the buffer, if the sequence number of the received broadcast data packet falls within the reception window and has not previously been stored in the buffer;
   wherein the selective combiner updates the reception window, if the sequence number of the received broadcast data packet does not fall within the reception window, and discards the received broadcast data packet, if the sequence number of the received broadcast data packet falls within the reception window and has previously been stored in the buffer,
   wherein the reception window is determined based on a foremost sequence number among sequence numbers of the broadcast data packets received, and a predetermined window size that is determined based on a maximum error range for reception points of broadcast data packets having a same sequence number, transmitted from different cells.

5. The apparatus of claim 4, wherein the selective combiner delivers, to an upper layer, a broadcast data packet having a sequence number which is outside a range of the reception window due to the update of the reception window, among the broadcast data packets stored in the buffer.

6. The apparatus of claim 4, wherein the selective combiner reorders broadcast data packets stored in the buffer in the order of sequence number and delivers, to an upper layer, a broadcast data packet having a sequence number preceding a reception-failed sequence number, wherein a reception-failed sequence number is a sequence number for which the corresponding broadcast data packet is missing.

7. A method for combining, by a user equipment (UE), broadcast data packets from a serving cell and at least one target cell in a mobile communication system including the UE, the serving cell for providing a particular broadcast service through a primary link set up by the UE, the target cell for providing the particular broadcast service through a secondary link set up by the UE, and a radio network controller (RNC) for providing broadcast data packets for the particular broadcast service to the serving cell and the target cell, the method comprising the steps of:
   receiving a broadcast data packet supporting selective combining from the serving cell and the target cell, respectively;
   determining if the received broadcast data packet has already been received;
   discarding the received broadcast data packet, if the received broadcast data packet has already been received;
   storing the received broadcast data packet in a buffer, if the received broadcast data packet has not already been received and falls within a reception window;
   reordering broadcast data packets stored in the buffer in an order of a sequence number; and
   delivering, to an upper layer, a broadcast data packet having a sequence number preceding a reception-failed sequence number, among the reordered broadcast data packets, wherein a reception-failed sequence number is a sequence number for which the corresponding broadcast data packet is missing;
   wherein the sequence number is an indicator for distinguishing the broadcast data packet, and a same sequence number is assigned to a same broadcast data packet in the serving cell and the target cell, wherein the reception window is determined based on a foremost sequence number among sequence numbers of the broadcast data packets received, and a predetermined window size that is determined based on a maximum error range for reception points of broadcast data packets having a same sequence number, transmitted from different cells.

8. The method of claim 7, wherein the received broadcast data packet is regarded as a previously received broadcast data packet, if a broadcast data packet having the same sequence number as the sequence number of the received broadcast data packet has been stored in the buffer.

9. An apparatus for combining, by a user equipment (UE), broadcast data packets from a serving cell and at least one target cell in a mobile communication system including the UE, the serving cell for providing a particular broadcast service through a primary link set up by the UE, the target cell for providing the particular broadcast service through a secondary link set up by the UE, and a radio network controller (RNC) for providing broadcast data packets for the particular broadcast service to the serving cell and the target cell, the apparatus comprising:

a duplication checker for determining if a broadcast data packet supporting selective combining received respectively from the serving cell and the target cell has already been received, discarding the received broadcast data packet if the received broadcast data packet has already been received, and storing the received broadcast data packet, if the received broadcast data packet has not already been received and falls within a reception window; and a reordering buffer for reordering the broadcast data packets in an order of sequence numbers, and delivering, to an upper layer, a broadcast data packet having a sequence number preceding a reception-failed sequence number, among the reordered broadcast data packets, wherein a reception-failed sequence number is a sequence number for which the corresponding broadcast data packet is missing;

wherein the sequence number is an indicator for distinguishing the broadcast data packet, and a same sequence number is assigned to a same broadcast data packet in the serving cell and the target cell, wherein the reception window is determined based on a foremost sequence number among sequence numbers of the broadcast data packets received, and a predetermined window size that is determined based on a maximum error range for reception points of broadcast data packets having a same sequence number, transmitted from different cells.

10. The apparatus of claim 9, wherein the duplication checker regards the received broadcast data packet as a previously received broadcast data packet if a broadcast data packet having a same sequence number as the sequence number of the received broadcast data packet has been stored in the reordering buffer.

11. A method for combining broadcast data packets from a plurality of cells in a user equipment (UE), the method comprising the steps of:

allocating a reception window based on a sequence number of a broadcast data packet supporting selective combining first received respectively from the plurality of cells, and a predetermined window size;

determining if a sequence number of a next broadcast data packet received from the plurality of cells falls within the reception window;

determining if a broadcast data packet having a same sequence number as the sequence number of the next broadcast data has already been stored in a buffer, if the sequence number falls within the reception window;

discarding the received next broadcast data packet, if the broadcast data packet having the same sequence number as the sequence number of the next broadcast data has already been stored in the buffer;

storing the received next broadcast data packet in the buffer, if the broadcast data packet having the same sequence number as the sequence number of the next broadcast data has not been stored in the buffer;

storing the next received broadcast data packet in the buffer, if the sequence number does not fall within the reception window;

updating the reception window based on the sequence number and the predetermined window size; and delivering, to an upper layer, a broadcast data packet having a sequence number that is outside a range of the updated reception window, among the broadcast data packets stored in the buffer, wherein the predetermined window size is determined based on a maximum error range for reception points of broadcast data packets having the same sequence number, transmitted from different cells.

12. The method of claim 11, further comprising the steps of:

reordering broadcast data packets stored in the buffer in an order of sequence numbers; and delivering, to the upper layer, a broadcast data packet having a sequence number preceding a reception-failed sequence number, wherein a reception-failed sequence number is a sequence number for which the corresponding broadcast data packet is missing.

* * * * *